(12) United States Patent
Xue et al.

(10) Patent No.: US 11,220,899 B2
(45) Date of Patent: Jan. 11, 2022

(54) GYRO MEASUREMENT WHILE DRILLING SYSTEM AND METHOD THEREFOR

(71) Applicant: INSTITUTE OF GEOLOGY AND GEOPHYSICS, CHINESE ACADEMY OF SCIENCES, Beijing (CN)

(72) Inventors: Xu Xue, Beijing (CN); Yang Dong, Beijing (CN); Xiaoxiao Zhang, Beijing (CN); Changchun Yang, Beijing (CN)

(73) Assignee: INSTITUTE OF GEOLOGY AND GEOPHYSICS, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 17/137,696

(22) Filed: Dec. 30, 2020

(65) Prior Publication Data
US 2021/0348502 A1    Nov. 11, 2021

Related U.S. Application Data

(63) Continuation of application No. PCT/CN2020/090519, filed on May 15, 2020.

(30) Foreign Application Priority Data

May 11, 2020    (CN) .......................... 202010393245.0

(51) Int. Cl.
*E21B 47/024*    (2006.01)
*G01C 19/56*    (2012.01)
(Continued)

(52) U.S. Cl.
CPC ............ *E21B 47/024* (2013.01); *E21B 47/12* (2013.01); *G01C 19/56* (2013.01); *G01P 15/08* (2013.01); *G01P 15/18* (2013.01); *E21B 2200/20* (2020.05)

(58) Field of Classification Search
CPC .............................. E21B 47/024; E21B 47/12
See application file for complete search history.

(56) References Cited

U.S. PATENT DOCUMENTS

2019/0169979 A1*   6/2019  Nguyen ................. E21B 47/024
2019/0330979 A1*  10/2019  Weston .................. G01C 19/38
2021/0026037 A1*   1/2021  Weston .................. E21B 47/022

* cited by examiner

*Primary Examiner* — Tara Schimpf
(74) *Attorney, Agent, or Firm* — Grossman, Tucker, Perreault & Pfleger, PLLC

(57) ABSTRACT

A gyro measurement while drilling system, which includes a strapdown inertial unit, a filtering and level conversion module, a data acquisition and data communication module, a driving mechanism, a driving control module and a navigation computer. A gyro measurement while drilling method, which is used in the measurement while drilling system and includes one or a combination of the following methods: a full parameter variable compensation method, an initial alignment algorithm and a continuous measurement while drilling method. The system and method of the present disclosure can meet the most demanding application scenarios in the field of petroleum drilling measurement, i.e., measurement while drilling (MWD), and are compatible with other scenarios, such as wireline measurement, gyro steerable measurement and other application fields; the system and method also solve the problems of environmental adaptability, bias repeatability and bias error of a gyroscope in a high-temperature and vibration environment, and solve the technical problems of an inertial instrument in a deep steerable drilling application scenario from the perspective of systems.

14 Claims, 11 Drawing Sheets

(51) Int. Cl.
*G01P 15/08* (2006.01)
*G01P 15/18* (2013.01)
*E21B 47/12* (2012.01)

GYRO MEASUREMENT WHILE DRILLING SYSTEM AND METHOD THEREFOR

FIELD

The present disclosure relates to the technical field of underground azimuth measurement while drilling, in particular to a gyro measurement while drilling system and a method therefor.

BACKGROUND

Directional drilling of directional wells refers to the drilling method of drilling to the target horizon along a preset well trajectory, which can be divided into geometric steerable drilling and geological steerable drilling according to the guiding basis. Geometric steerable drilling usually refers to the steerable drilling method of controlling the well trajectory by using the geometric parameters (the well inclination angle, the azimuth angle and the tool face angle) of the well measured by a Measurement While Drilling (MWD) tool. Geological steerable drilling means, in addition to the capability of geometric steering, the capability of controlling the well trajectory in real time according to the geological parameters (stratum lithology, stratum level, oil rock characteristics, etc.) obtained by Logging While Drilling (LWD), so that the drill bit can drill along the optimal position of the stratum.

The MWD solution consisting of a fluxgate magnetometer and a quartz flexible accelerometer, which appeared in 1978, defined the basic specifications of MWD because of its excellent measurement accuracy and adaptability in harsh environments, and quickly became the standardized product of major oil companies. The breakthrough of key technologies of these two types of core sensors played a key role. The fluxgate magnetometer realizes azimuth measurement by sensing geomagnetic field, and because the fluxgate magnetometer has no moving parts, the fluxgate can be hardly influenced by harsh environments such as vibration and impact. In addition, due to the breakthrough of the core material with high temperature resistance, the fluxgate magnetometer has become the preferred sensor for azimuth measurement. Another core sensor is an inertial sensor. A quartz flexible accelerometer is a sensor sensing inertial space acceleration, and it mainly senses gravity acceleration in the MWD, and it was mainly used for military purposes at the beginning. A quartz flexible accelerometer forms an inertial navigation system for various missiles and aircrafts together with a gyroscope. Manufacturers represented by Japan Aviation Electronics Industry, Limited (JAE) and Honeywell in the United States have improved and optimized the military inertial navigation quartz accelerometer, making it meet the requirement for precision under a high temperature and strong vibration. In addition, the data transmission technology has made a breakthrough at this time, that is, the development of sensor technology and data transmission technology makes the magnetic MWD become the mainstream technology of directional well measurement.

However, during the past 40 years since the appearance of the magnetic MWD, the research and application of gyro inertial technology in petroleum field has never stopped. On one hand, new gyroscopes are constantly appearing, and the accuracy and environmental adaptability of gyroscopes are getting higher and higher; on the other hand, the more complex well trajectory measurement requires higher and higher measurement accuracy. During this period, gyroscope applications mainly include: North Seeking Gyro, Gyro Steering, Continuous North Seeking Gyro Systems, Drop Gyro, and Gyro-MWD that is present recently, which have pushed the gyro technology to a new height.

Schlumberger, Baker Hughes, Gyrodata, Scientific Drilling, etc., have been committed to the development of the gyro (while drilling) measurement system in the past decades.

Thereinto, Baker Hughes reported a ring laser inertial guidance surveyor (RIGS) as early as 1987. RIGS is a wireline gyro measuring instrument composed of a small triaxial laser gyro. RIGS has a laser gyro with strategic precision and also possesses the ability of static point measurement and continuous measurement. However, due to the size and environmental adaptability of the laser gyro, RIGS cannot be applied in the field of measurement while drilling.

The North Seeking Gyro of the Keeper series is a representative product of Scientific Drilling Company of the United States, which can be used for orientation and borehole trajectory measurement. In the past ten years, the North Seeking Gyro has a high market share, so it is considered to be a very successful product in the wireline logging industry.

Keeper is divided into three operation modes, namely: Gyro Compass, Low Angle High Speed and High Angle High Speed. The coordinate system is defined as northeast, which respectively represents XYZ axes. An accelerometer and a gyroscope are installed on the X axis. An accelerometer is installed on the Y axis and a gyroscope is installed on the Z axis. In addition, a gyroscope was used in the report, so it can be judged that a dynamically tuned gyroscope (DTG) is used by Keeper. The DTG is a frame-type and high-speed motor-rotor biaxial gyroscope, which provides angular rate information for the X axis and the Z axis respectively. Different combinations are used in the three operation modes of the gyroscope.

Keeper adopts the classical stable platform solution, which requires a complex frame gimbals structure design to cooperate with actuators such as steering sensor and motors, establishes inertial spaces under various well inclination angles, and completes the corresponding azimuth measurement. For continuous measurement of small and large well inclination angles, the previous state is taken as an initial value. Once power failure occurs or large errors are caused by environmental factors, it is necessary to return to the initial state of north-seeking of vertical wells to obtain the initial attitude and orientation.

A dynamically tuned gyroscope is still based on a high-speed rotating motor to realize gyro effect. Unlike traditional float-type gyroscopes, a dynamically tuned gyroscope uses flexible support to suspend a gyro rotor and separates the gyro rotor from a driving motor, and uses the dynamic effect torque generated by a balance ring to compensate the elastic torque of the flexible support to realize closed-loop measurement. The dynamically tuned gyroscope is ingenious in design. When it reaches a tuning state, a dynamically tuned gyroscope will show the characteristics of a free gyroscope in a small angle range. It is a miniaturized dual-axis gyroscope, which is an important innovation in the rotor gyroscope technology. The dynamically tuned gyroscope was also used in the field of measurement (while drilling) quite early. For example, Gyrodata Company of the United States has continuously improved the design and technology of the dynamically tuned gyroscope, so that its accuracy and service life are continuously improved under a high-temperature and vibration environment.

With the development of computer technology, strapdown inertial technology requires a gyroscope to have technical advantages such as a small size, a large range and high reliability. With new inspirations brought by the Foucault pendulum and Coriolis effect, the way of establishing a gyro effect has changed from the previous high-speed rotating rotor technology to Coriolis vibration, which greatly emancipates the mind in the technical direction of small size and reliability. As for a Coriolis vibration gyroscope, it can be divided into Type I and Type II. Type I mostly adopts a tuning fork solution, such as an early MEMS comb gyroscope in the Draper Lab and a quartz tuning fork gyroscope in the BEI, while Type II adopts a fully symmetric structure, which greatly improves the isotropy index of frequency and damping. And precisely because of the design of a symmetric structure, self-testing and self-calibration of the gyroscope can be realized conveniently, and the unity of a force balance rate mode and a rate integration full angle mode can be realized. Examples of representative products include a MEMS ring-shaped gyroscope, a MEMS-Disk gyroscope of Jet Propulsion Laboratory (JPL), and a hemispherical gyroscope HRG.

The demand for high-end gyroscopes in oil exploration and development are: gyroscopes working under high temperature and strong vibration and having a small volume and high precision have always been the unswerving pursuit of the inertial technology in the oil industry. Especially in the case of interference of a fluxgate magnetometer during directional drilling, gyroscopes are not unnecessary at present, but there is no suitable gyroscope product which can satisfy the standard constructed by the magnetic MWD, i.e. work normally for a long time in harsh environments such as high temperature and strong vibration.

As the gyroscope technology applied to steerable drilling, the reliability in harsh environments is an important basis for selecting gyroscopes. The purpose of the present disclosure is to develop a gyro system that can meet the most demanding application scenario in the field of oil drilling measurement: measurement while drilling (MWD), and is compatible with other scenarios, such as wireline measurement, gyro steerable measurement and other application fields. It also solves the environmental adaptability and bias repeatability of the gyroscope in a high-temperature and vibration environment, and solves the technical problems of an inertial instrument in a deep steerable drilling application scenario from the perspective of systems. That is, the gyro needs to have high precision and good environmental adaptability in severe environments such as high temperature, strong vibration and large impact, and also take into account the small size requirement of the probe tube.

SUMMARY

A gyro measurement while drilling system and a method therefor provided by the disclosure can meet the requirements of measurement while drilling in the field of petroleum drilling measurement and are compatible with other scenarios, aiming at solving the problems of environmental adaptability and bias repeatability of gyroscopes in high-temperature and vibration environments, and solving the technical problems of inertial instruments in deep steerable drilling application scenarios from the perspective of systems and methods.

According to the first aspect of the present disclosure, a gyro measurement while drilling system is provided, including: a strapdown inertial unit, including a gyroscope and an accelerometer fixedly connected in a probe tube; a filtering and level conversion module, configured to perform anti-aliasing filtering and level conversion for an output signal of the strapdown inertial unit and output a result to a data acquisition and data communication module; the data acquisition and data communication module, configured to acquire output data of the anti-aliasing filtering and level conversion module and output processed related data to a navigation computer according to a working mode instruction received from the navigation computer; a driving mechanism, configured to receive a control instruction from a driving control module and drive the strapdown inertial unit to rotate; the driving control module, configured to respond to a control mode of the data acquisition and data communication module and send out the control instruction for driving the driving mechanism; and the navigation computer, configured to output the working mode instruction to the data acquisition and data communication module according to the received control instruction, calculate and process relevant data, and output a processing result.

Furthermore, the gyroscope is a Coriolis vibration gyroscope.

Furthermore, the output signal of the strapdown inertial unit includes an internal parameter signal of the gyroscope, and the internal parameter signal includes, but is not limited to, a temperature of an inertial instrument, a temperature of a circuit, vibration amplitude of the gyroscope, a resonance frequency of the gyroscope, and an quadrature coupling output signal of the gyroscope.

Furthermore, the Coriolis vibration gyroscope is fully symmetrical.

Furthermore, the measurement while drilling system further includes an angle measuring unit configured to measure a rotation angle of the strapdown inertial unit.

Furthermore, the measurement while drilling system further includes a vibration and shock acquisition unit configured to acquire vibration and shock signals in a working process of the measurement while drilling system in real time and monitor a working state of the measurement system.

Furthermore, the modules used for calculation and processing of related data in the navigation computer includes a full parameter compensation module, an initial alignment module and a continuous measurement while drilling module.

Furthermore, the full parameter compensation module is configured to compensate a drift error of the gyroscope or the accelerometer caused by temperature and vibration, by collecting multiple observation points inside the gyroscope and the accelerometer, through error modeling and a related algorithm.

Furthermore, the initial alignment module is configured to senses respectively earth rotation angular rate information and gravity acceleration information by a gyroscope and an accelerometer under a static base of the measurement system, calculate initial values of an azimuth angle, a well inclination angle and a tool face angle through a coarse alignment algorithm, and then calculate the azimuth angle, the well inclination angle and the tool face angle of Gyro Measurement while Drilling (GMD) through an optimal estimation algorithm combined with external auxiliary information.

Furthermore, the continuous measurement while drilling module is configured to output of information about the azimuth angle, the well inclination angle and the tool face angle in real time when the measurement while drilling system works continuously through a relevant algorithm based on the azimuth angle, the well inclination angle and the tool face angle calculated by the initial alignment module.

According to the second aspect of the present disclosure, provided is a gyro measurement while drilling method, wherein the method includes one or a combination of the following methods: 1) a full parameter variable compensation method; 2) an initial alignment algorithm; and 3) a continuous measurement while drilling method.

Furthermore, the full parameter variable compensation method is specifically:

establishing a comprehensive model of a gyroscope bias related to temperature as shown in the following equation:

$$B_0(T) = \Sigma k_{P_i} \times P^i + \Sigma k_{Q_i} \times Q^i + \Sigma k_{T_i} \times T^i + \Sigma k_{A_i} \times A^i,$$

then an estimated value of the gyroscope bias is as follows:

$$\hat{B} = B_r - B_0(T),$$

$B_0$ refers to a fitting modeling calculation value of a temperature-related comprehensive bias error, $B_r$ represents the original output of the gyroscope, $\hat{B}$ is the estimated value after a modeling error is eliminated, P represents the phase-locked control voltage of a resonator, Q is a demodulation value of quadrature coupling, T is the temperature of the resonator, $A^i$ is the vibration amplitude of the resonator, and $k_{P_i}$, $k_{Q_i}$, $k_{C_i}$ and $k_{A_i}$ are linear regression fitting coefficients.

Furthermore, the initial alignment algorithm includes a two-position analytical alignment algorithm.

Furthermore, the well inclination angle calibrated by the two-position analytical alignment algorithm is:

$$\hat{\theta} = a\tan 2(\hat{f}_x^b, \sqrt{(\hat{f}_x^b)^2 + (\hat{f}_z^b)^2});$$

the calibrated tool face angle is:

$$\hat{\gamma} = a\tan 2[-\hat{f}_x^b, (\bar{f}_z^{b2} + \bar{f}_z^{b1})];$$

the calibrated azimuth angle is:

$$\hat{\psi} = a\tan 2(\hat{\omega}_x^b \cos \hat{\gamma} + \hat{\omega}_z^b \sin \hat{\gamma}, \hat{\omega}_x^b \sin \hat{\theta} \sin \hat{\gamma} + \hat{\omega}_g^y \cos \hat{\theta} - \hat{\omega}_z^b \cos \hat{\gamma} \sin \hat{\theta})$$

wherein positions of the gyroscope before and after the position is changed are $b_1$ and $b_2$, and average values of sampling outputs of corresponding gyroscopes in alignment time are $\bar{\omega}^{b1}$ and $\bar{\omega}^{b2}$, respectively, and average values of sampling outputs of the accelerometer before and after the position is changed are $\bar{f}^{b1}$ and $\bar{f}^{b2}$, respectively; subscripts x, y and z respectively represent components of the sampling output mean values on x, y and z axes respectively;

wherein, an estimated value of the accelerometer after two-position calibration is:

$$\begin{cases} \hat{f}_x^b = \frac{1}{2}(\bar{f}_x^{b2} - \bar{f}_x^{b2}) \\ \hat{f}_y^b = \frac{1}{2}(\bar{f}_y^{b2} - \bar{f}_y^{b2}) \end{cases};$$

an estimated value of the gyroscope after two-position calibration is:

$$\begin{cases} \hat{\omega}_x^b = \frac{1}{2}(\bar{\omega}_x^{b2} - \bar{\omega}_x^{b1}) \\ \hat{\omega}_y^b = \frac{1}{2}(\bar{\omega}_y^{b2} - \bar{\omega}_y^{b1}) \end{cases},$$

and the accelerometer and gyroscope of the Z axis are unobservable, and an average value before and after the positions are changed is directly taken as the estimated value after calibration:

$$\begin{cases} \hat{f}_z^b = \frac{1}{2}(\bar{f}_z^{b2} - \bar{f}_z^{b2}) \\ \hat{\omega}_z^b = \frac{1}{2}(\bar{\omega}_z^{b2} - \bar{\omega}_z^{b2}) \end{cases}.$$

Furthermore, the initial alignment algorithm further includes a Kalman filtering algorithm to further optimize the estimated azimuth angle, well inclination angle and tool face angle of the measuring system.

Furthermore, the continuous measurement while drilling method includes a well trajectory fitting algorithm under measurement while drilling, and for continuous measurement while drilling, the well trajectory is calculated and fitted by way of Minimum Curvature Method (MCM).

The disclosure has the following beneficial effects:

The system and method of the disclosure can meet the most demanding application scenarios in the field of petroleum drilling measurement: measurement while drilling (MWD), and are compatible with other scenarios, such as wireline measurement, gyro steerable measurement and other application fields; the system and method also solve the problems of environmental adaptability, bias repeatability and bias error of a gyroscope in a high-temperature and vibration environment, and solve the technical problems of an inertial instrument in a deep steerable drilling application scenario from the perspective of systems.

BRIEF DESCRIPTION OF THE DRAWINGS

In order to explain the embodiments of the present disclosure or the technical solution in the prior art more clearly, the drawings required in the embodiments or the description of the prior art will be briefly introduced below. Obviously, the drawings in the following description are only some embodiments of the present disclosure, and other drawings can be obtained according to the structures shown in these drawings without paying creative work for those skilled in the art.

DETAILED DESCRIPTION OF THE DRAWINGS

Figure 1:
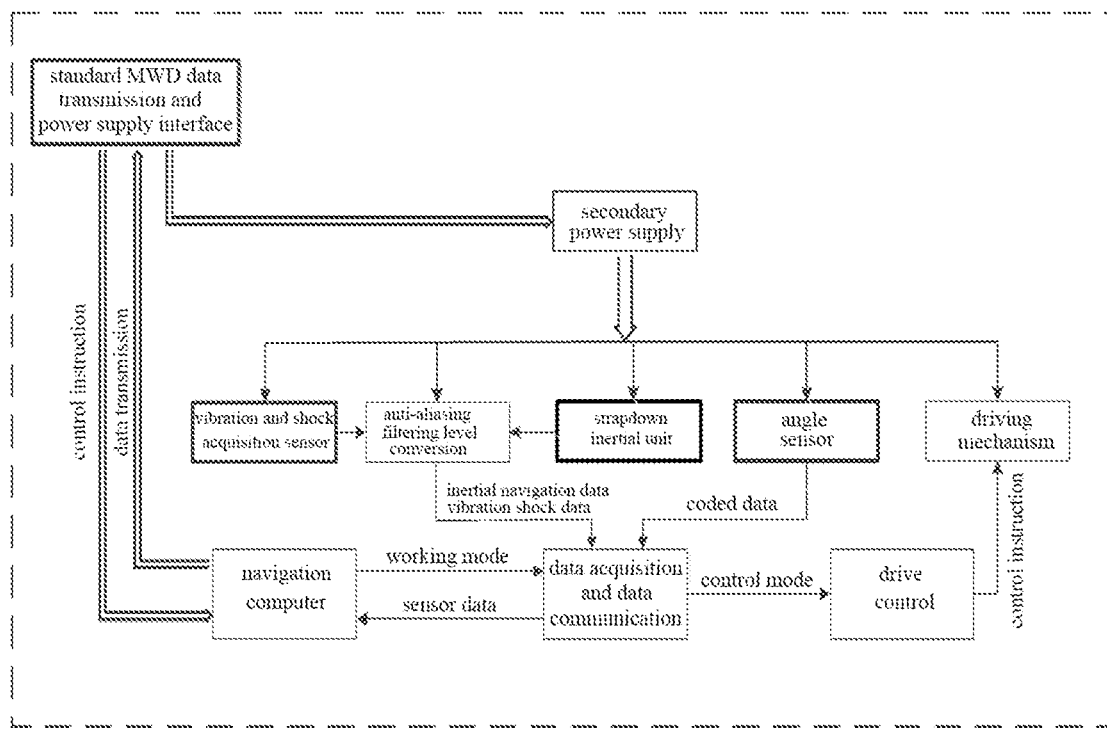
FIG. 1 is a block diagram of a gyro measurement while drilling system in the present disclosure.

Exemplary embodiments will be described in detail herein, examples of which are shown in the drawings. When the following description refers to the drawings, unless otherwise indicated, the same numbers in different drawings refer to the same or similar elements. The embodiments described in the following exemplary embodiments do not represent all embodiments consistent with the present disclosure. Rather, they are merely examples of devices and methods consistent with some aspects of the present disclosure as detailed in the appended claims.

With reference to FIG. 1, the structure of a GMD system of the present disclosure includes a strapdown inertial unit, a vibration and shock acquisition sensor, an angle sensor, a driving mechanism, an anti-aliasing filtering and level conversion module, a data acquisition and data communication module, a navigation computer and a secondary power supply.

1. The strapdown inertial unit refers to a unit obtained by quadrature installing a high-temperature gyroscope and a high-temperature accelerometer and fixedly connecting them in the probe tube. As an embodiment, the high-temperature gyroscope adopts a fully symmetric gyroscope (which is called type II) based on the Coriolis vibration gyroscope principle, which has the following characteristics:

1) the resonator is completely symmetrical, 2) a capacitance or piezoelectric detection and driving mode is adopted, 3) the resonator is made of fused quartz, silicon (MEMS), elastic alloy and other materials, 4) electrodes are driven and detected in a contact or non-contact manner.

The high-temperature accelerometer is a high-temperature quartz flexible accelerometer or a high-temperature MEMS accelerometer.

As an embodiment, a tri-axial geomagnetic field-sensing sensor such as a fluxgate sensor can also be installed in the strapdown inertial unit.

2. The vibration and shock acquisition sensor senses the vibration and shock signals in the working process of the GMD in real time, which can be used to monitor the working state of the GMD and interpret the validity of acquired data.

As an embodiment, the sensor can be of a MEMS-type or a piezoelectric-type, which requires a high frequency band width to meet the requirement of collecting vibration signals at a high frequency of 2 KHz or even 5 KHz.

3. The angle sensor is a sensor for measuring the rotation angle of the strapdown inertial unit. In order to eliminate the constant drift error of a gyroscope under a high-temperature and vibration environment, it is necessary to rotate the strapdown inertial unit. This sensor measures the rotation angle, which can be used as the basis for error elimination and data fusion.

4. The driving mechanism receives a control instruction from a drive controlling module, and drives the motor to drive the strapdown inertial unit to rotate.

5. The anti-aliasing filtering and level conversion module performs filtering and level conversion on the output signal of the strapdown inertial unit, and then outputs a result to the data acquisition and data communication module at the same time, the module also filters the vibration and shock acquisition sensor and outputs a result to the data acquisition and data communication module.

In one embodiment, a low-pass filter is used to filter the output signal of the strapdown inertial unit, and plays an anti-aliasing role. A band-pass filter is used to filter the vibration and shock acquisition sensor, and the cut-off frequencies of the filters are set to be 10 Hz and 5 KHz, so that vibration interference events can be acquired instead of low-frequency signals.

6. The data acquisition and data communication module, on the one hand, firstly collects the output data from the "anti-aliasing filtering and level conversion module", that is, the outputs of the strapdown inertial unit (including outputs of the gyroscope and the accelerometer, and internal key parameter outputs of the gyroscope and the accelerometer) and the vibration and shock sensor after filtering and level conversion.

In addition, the encoded signal output by the angle sensor is collected and output to the drive controlling module as the basis of a control instruction. Sensor data is output to the "navigation computer" according to the received working mode instruction from the navigation computer. The data includes: data of the strapdown inertial unit, data of the vibration and shock sensor, data of the angle sensor, etc.

The data acquisition and data communication module is usually composed of an analog-to-digital converter (ADC) and a FPGA 7. The navigation computer According to the received control instruction of the standard MWD interface, the working mode instruction is output to the data acquisition and data communication module, the data of the sensor is calculated and processed, and the processing result is output to the MWD standard interface.

8. The secondary power supply supplies power to the above modules

In the present disclosure, mechanical and electrical interfaces compatible with the standard traditional magnetic MWD are adopted, and data communication protocols are also compatible.

Figure 2:
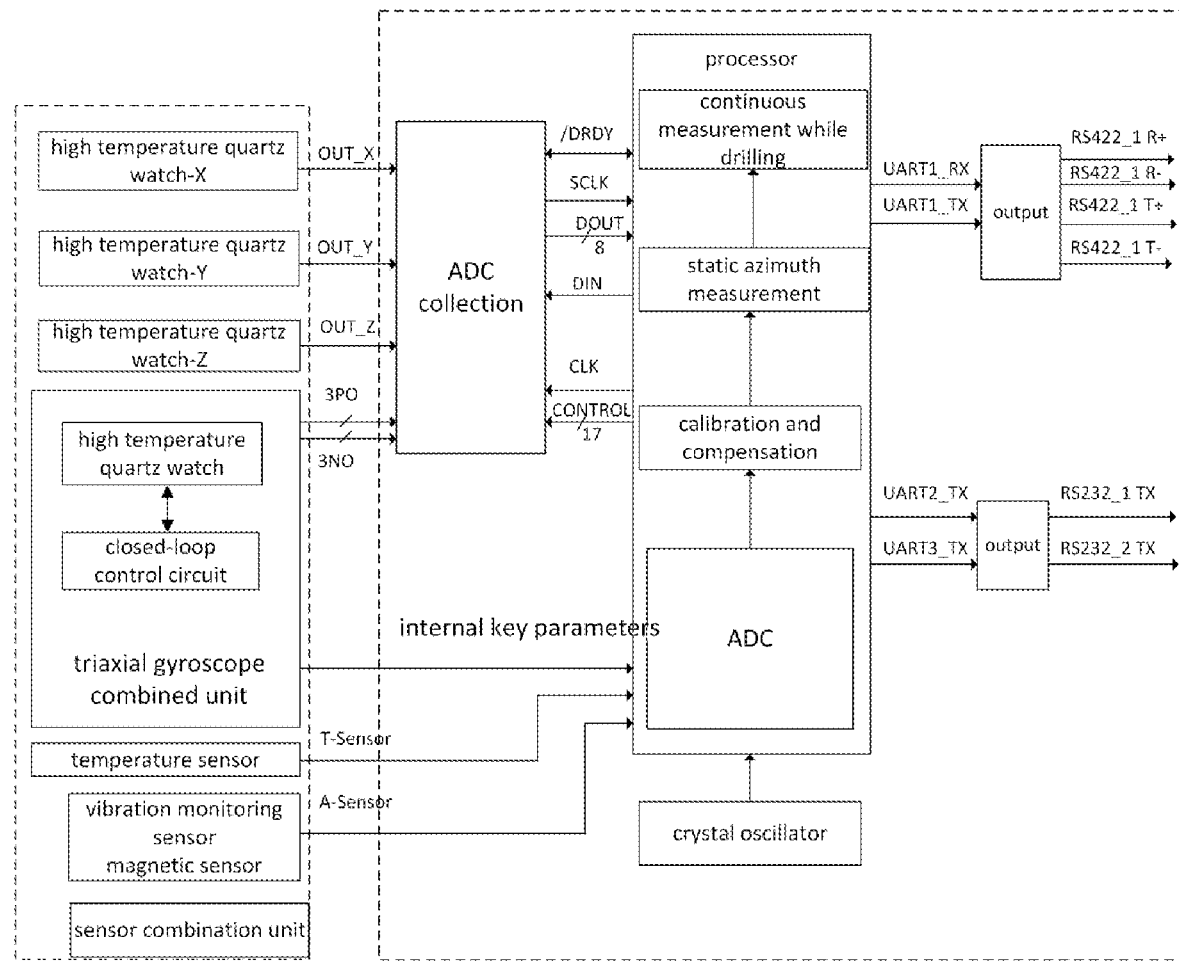
FIG. 2 is a block diagram of signal transmission of the GMD system in the present disclosure.

FIG. 2 is a signal transmission diagram of a GMD system. The signal acquisition and data communication includes the acquisition and transmission of gyro signals, accelerometer signals, sensor signals sensing geomagnetic field, vibration monitoring signals, temperature signals, angle signals, etc. A signal processing unit is implemented in the navigation computer, including but not limited to a full parameter compensation module, an initial alignment module, a continuous measurement while drilling module, a filtering (such as an anti-aliasing filter) module, etc.

The full parameter compensation module is configured to compensate a drift error of a gyroscope or an accelerometer caused by temperature and vibration by collecting a plurality of observation points inside the gyroscope and accelerometer through error modeling and related algorithms.

The initial alignment module is configured to calculate the initial values of the azimuth angle, the well inclination angle and the tool face angle under a static base of GMD, by respectively sensing earth rotation angular rate information and gravity acceleration information with a gyroscope and an accelerometer, generally through a coarse alignment algorithm, and then calculate the azimuth angle, the well inclination angle and the tool face angle of the GMD by combining with external auxiliary information such as zero-speed correction information through a Kalman optimal estimation algorithm.

The continuous measurement while drilling module is configured to output information about the azimuth, the well inclination angle and the tool surface in real time when the GMD works continuously through relevant algorithms on the basis of the azimuth angle, the well inclination angle and the tool surface angle obtained by initial alignment calculation.

The above-mentioned strapdown inertial unit and the vibration and shock acquisition sensor together constitute a sensor combination unit. The inside of strapdown inertial unit is provided with a triaxial accelerometer, a triaxial gyroscope and an internal temperature sensor, and the internal temperature sensor is built in the gyroscope and accelerometer, or placed inside the strapdown inertial unit, closely attached to the accelerometer and gyroscope to minimize the temperature gradient.

Figure 3:
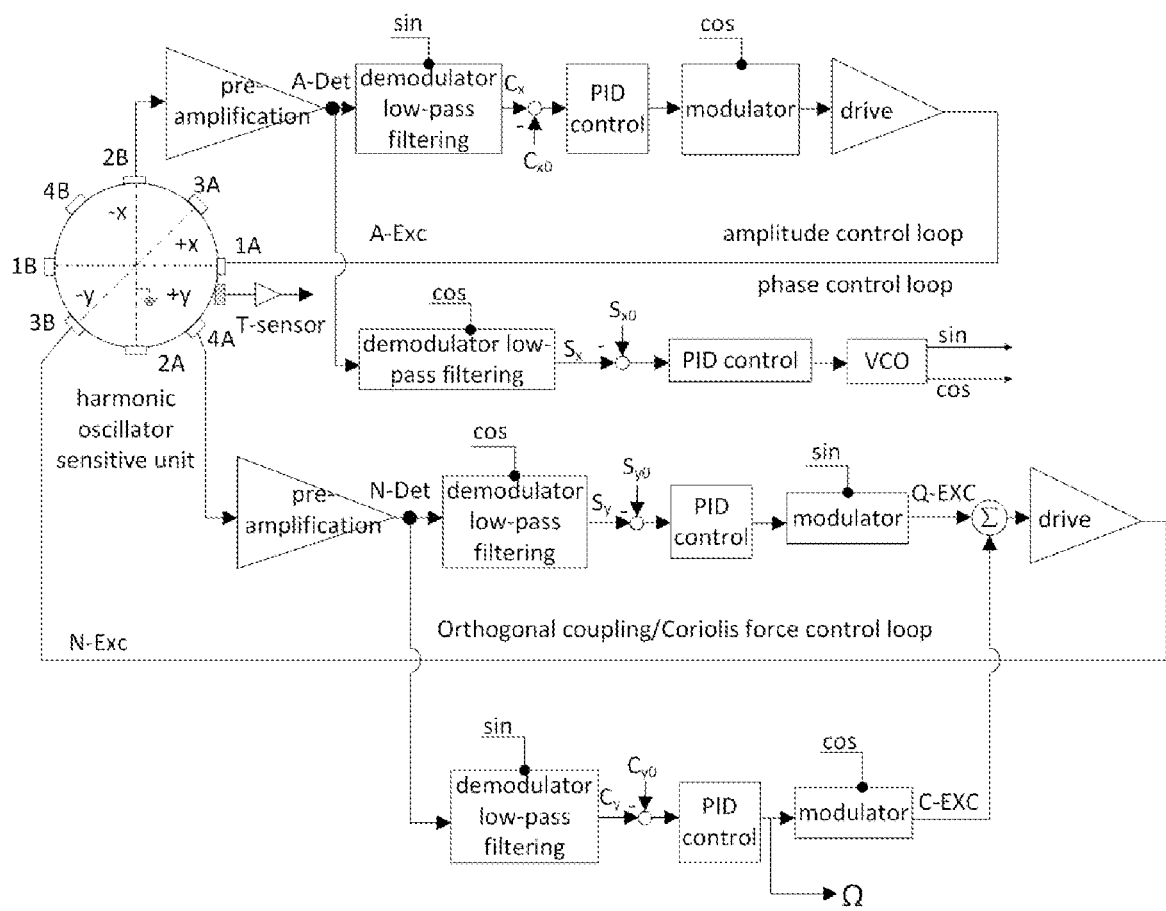
FIG. 3 is a block diagram of a gyroscope closed-loop control system in the present disclosure.

Thereinto, the gyroscope includes two parts: a sensing unit and a closed-loop control circuit. The block diagram of the gyroscope closed-loop control system is shown in FIG. 3, and the closed-loop control circuit is described as follows:

In FIG. 3, $C_x$ and $C_y$ are quadrature components of a demodulation value of a fixed driving axis, and $S_x$ and $S_y$ are quadrature components of a demodulation value of a fixed measuring axis, $C_x$ represents the amplitude of a driving axis, $S_x$ represents the phase correlation of the driving axis, $C_y$ is the Coriolis force correlation of a detecting axis, $S_y$ represents quadrature coupling. Four coefficients are used as inputs of a closed-loop control system, which respectively realize:

1) amplitude closed-loop control: an automatic gain control loop (AGC) is usually adopted, so that the resonator oscillates with equal amplitude on the driving axis, and the oscillation amplitude is maintained to a preset value, namely: $C_x = C_{x_0}$.

2) phase closed-loop control: generally, a phase-locked loop circuit (PLL) is used to make the phase difference $\delta\varphi = \varphi - \hat{\varphi}$ tend to zero through PID control. Similar to amplitude control, setting $S_{x_0} = 0$ realizes that the resonator works at its natural working frequency $\omega_x$.

3) Coriolis force closed-loop control: through PID closed-loop control, the closed-loop feedback force is realized to balance the input Coriolis force in real time, and the standing wave is fixedly bound to a fixed electrode, that is, the precession angle meets the condition of $\theta = \theta_0$, which is usually set as $\theta_0 = 0$. The error quantity $C_y$ representing the real-time precession angle is the input of a PID control signal, which is implemented by control strategy, so that the error quantity $C_y = \theta_0 = 0$.

4) Quadrature coupling closed-loop control: similar to Coriolis force closed-loop control, $S_y$ representing the quadrature coupling error is taken as the input of the PID control signal, and $S_y$ of the quadrature coupling error meets the condition of $S_y = S_{y_0} = 0$ through closed-loop control.

At present, the measurement while drilling system based on gyroscope technology (which is called GMD in the present disclosure) faces the following challenges:

1) The problem of bias error of the inertial instruments (accelerometers and gyroscopes, especially gyroscopes herein) in directional well measurement, especially in measurement while drilling, mainly causes errors of a gyro sensing unit and a control circuit in a high-temperature environment and a continuous strong vibration environment. And the errors include a long-time stability error and a repeatability error. The present disclosure can compensate the errors of the inertial instruments due to temperature and vibration environments through the "full parameter variable compensation" technology. The way of compensation is to establish an error model that affects gyroscope bias through off-line calibration and testing, calculate the correlation coefficients of the compensation model through relevant algorithms, and embed the coefficients into the navigation computer so as to realize real-time bias compensation in a working state, and the compensated output presents a normal distribution.

2) Using an external reference to eliminate the repeatability error: for example, in the way of changing positions, because the output of a gyroscope after comprehensive compensation presents a normal distribution, the random error of the gyroscope can be eliminated by changing the input polarity of the inertial instrument (for example, 0 deg-180 deg rotation), and the bias of the gyroscope can be obtained by identification, 3) Using an external reference to eliminate the repeatability error: an external reference input signal, such as static zero-speed information, can realize the optimal estimation and elimination of the bias error of a gyroscope by optimal control, such as Kalman.

They are described as follows:

Full Parameter Variable Compensation

In the aforementioned FIG. 2, the data acquisition and data communication module (ADC+FPGA) not only collects the outputs of the gyroscope and accelerometer, but also collects the outputs of a temperature sensor and variables of key parameters inside the gyroscope. As an embodiment, four closed-loop control system demodulator outputs are collected, including: a phase-locked control voltage P, a demodulation value Q of quadrature coupling, a driving axis control voltage A, temperature sensor output T, or a combination of the above parameters.

Temperature is an important factor that affects the stability of the inertial instruments. The change of temperature leads to the change of material characteristics of sensing units. According to the error model of a gyroscope, frequency split, anisodamping error and control-loop errors are the main factors that lead to the gyro bias error, while temperature is the key factor that directly affects the stability of these three kinds of errors. All kinds of errors are coupled with one another. A comprehensive model of the gyro bias related to temperature is established as shown in Equation (1):

$$B_0(T) = \Sigma k_{P_i} \times P^i + \Sigma k_{Q_i} \times Q^i + \Sigma k_{T_i} \times T^i + \Sigma k_{A_i} \times A^i \quad (1)$$

then an estimated value of the gyroscope bias is as follows:

$$\hat{B} = B_r - B_0(T) \quad (2)$$

In Equation (2), $B_0$ refers to a fitting modeling calculation value of a temperature-related comprehensive bias error, $B_r$ represents the original output of the gyroscope, $\vec{B}$ is the estimated value after a modeling error is eliminated, P represents the phase-locked control voltage of a resonator, Q is a demodulation value of quadrature coupling, T is the temperature of the resonator, A is the vibration amplitude of the resonator, and $k_{P_i}$, $k_{Q_i}$, $k_{C_i}$ and $k_{A_i}$ are linear regression fitting coefficients.

Figure 4A:
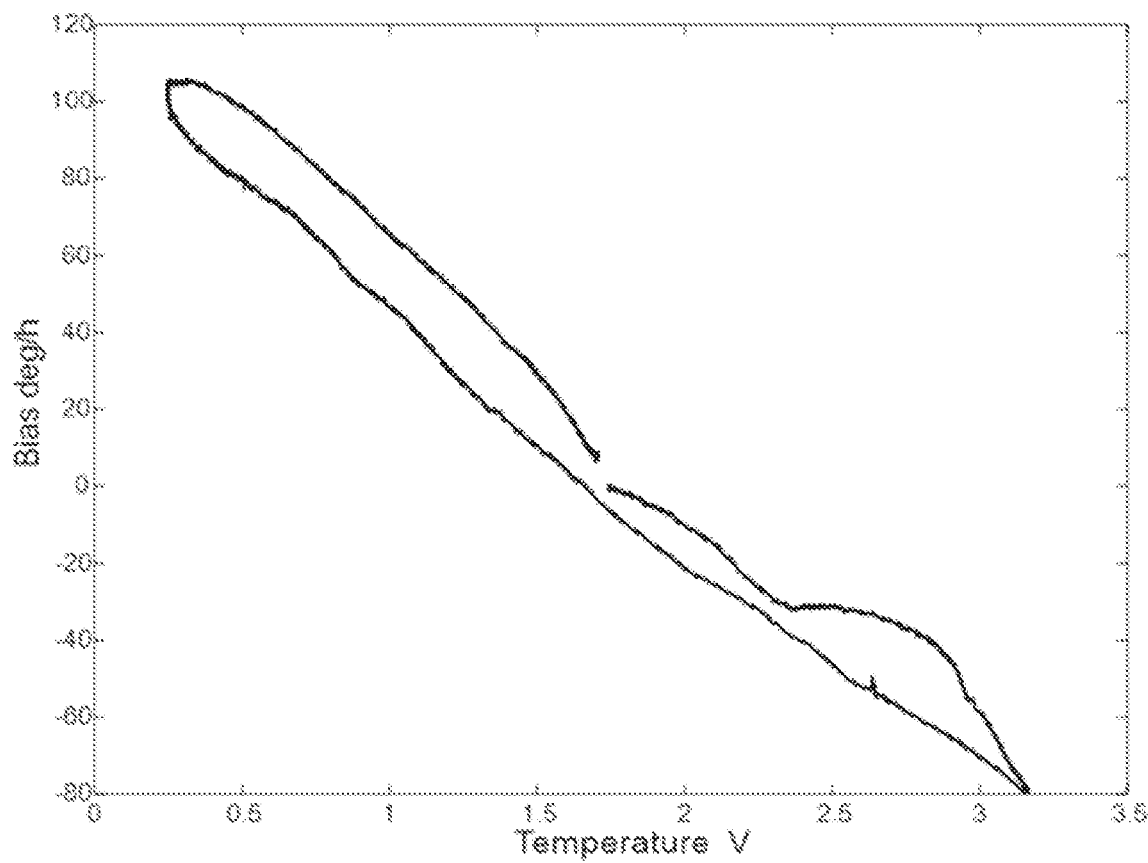
FIG. 4A shows the relationship between an original output of a gyroscope and temperature.

During the test, the temperature of an incubator is cycled from −40° C. to 85° C. for many times, and the actual temperature inside the sensing unit is collected by a built-in temperature sensor of the gyroscope, and the output curve of the original output of the gyroscope and the built-in temperature sensor is tested. As shown in FIG. 4(a), one piece of the temperature cycle data shows that there is an obvious correlation between the bias output of the gyroscope and the temperature, but it can also be seen that there is obvious hysteresis in the process of heating and cooling.

Figure 4B:
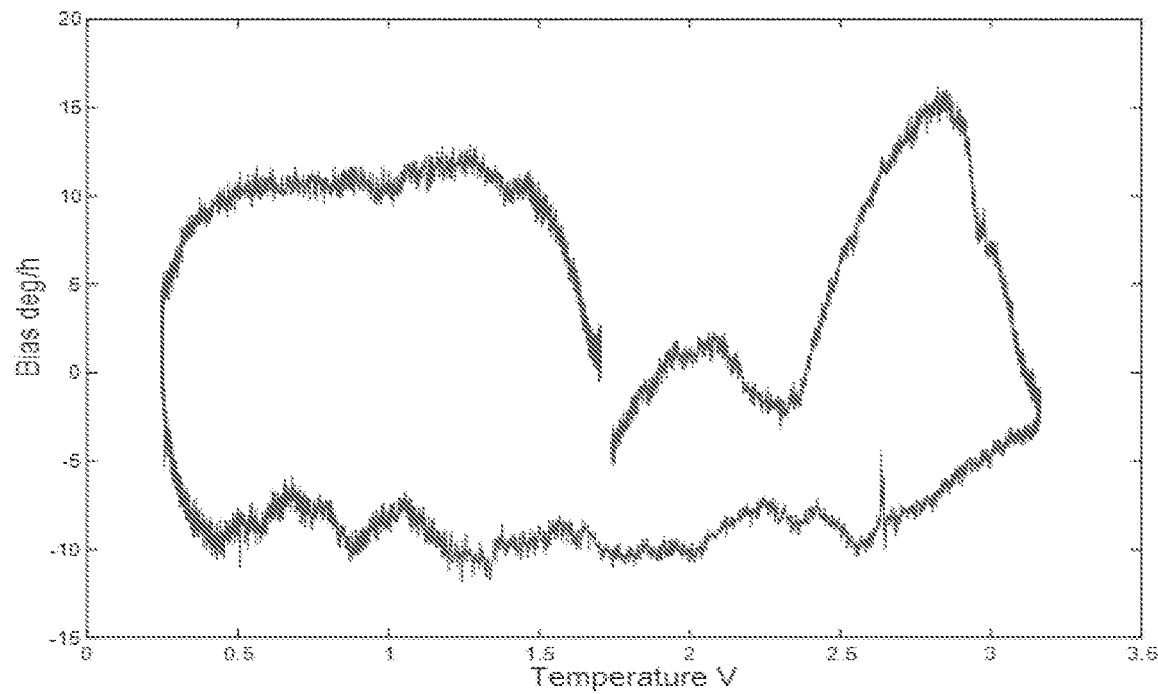
FIG. 4B shows gyro bias estimation with single temperature compensation.

As shown in FIG. 4(b), the sampling results are modeled by a single temperature field, and the compensated bias estimation value $\hat{B}$ is shown in FIG. 4(b). It can be seen that after temperature compensation, the output of the gyroscope is no longer affected by the linearity of temperature, and the temperature characteristics are improved. However, after single compensation, there is still a large residual value. Standard variance is often used in engineering to evaluate the bias stability. The bias stability of FIG. 4(b) after compensation can reach: $1\sigma=6.2$ deg/h.

Figure 4C:
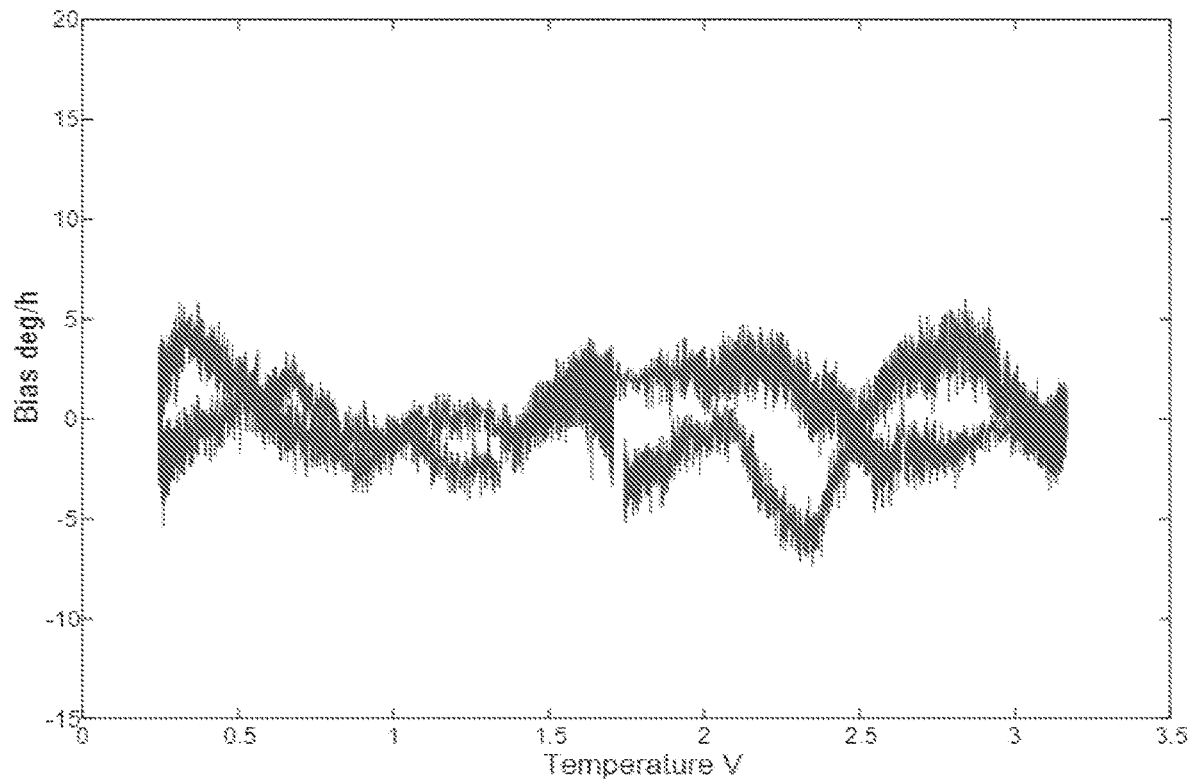
FIG. 4C shows gyro bias estimation after comprehensive temperature compensation.

In order to solve the accuracy problem of single temperature compensation, the comprehensive compensation model given by Equation (2) is adopted, and the estimated gyro bias curve is shown in FIG. 4(c). It can be seen that the gyro bias estimation converges obviously, and the calculated bias stability after comprehensive compensation can reach $1\sigma=1.9$ deg/h, which improves the measurement accuracy by more than three times compared with single compensation.

Figure 5A:
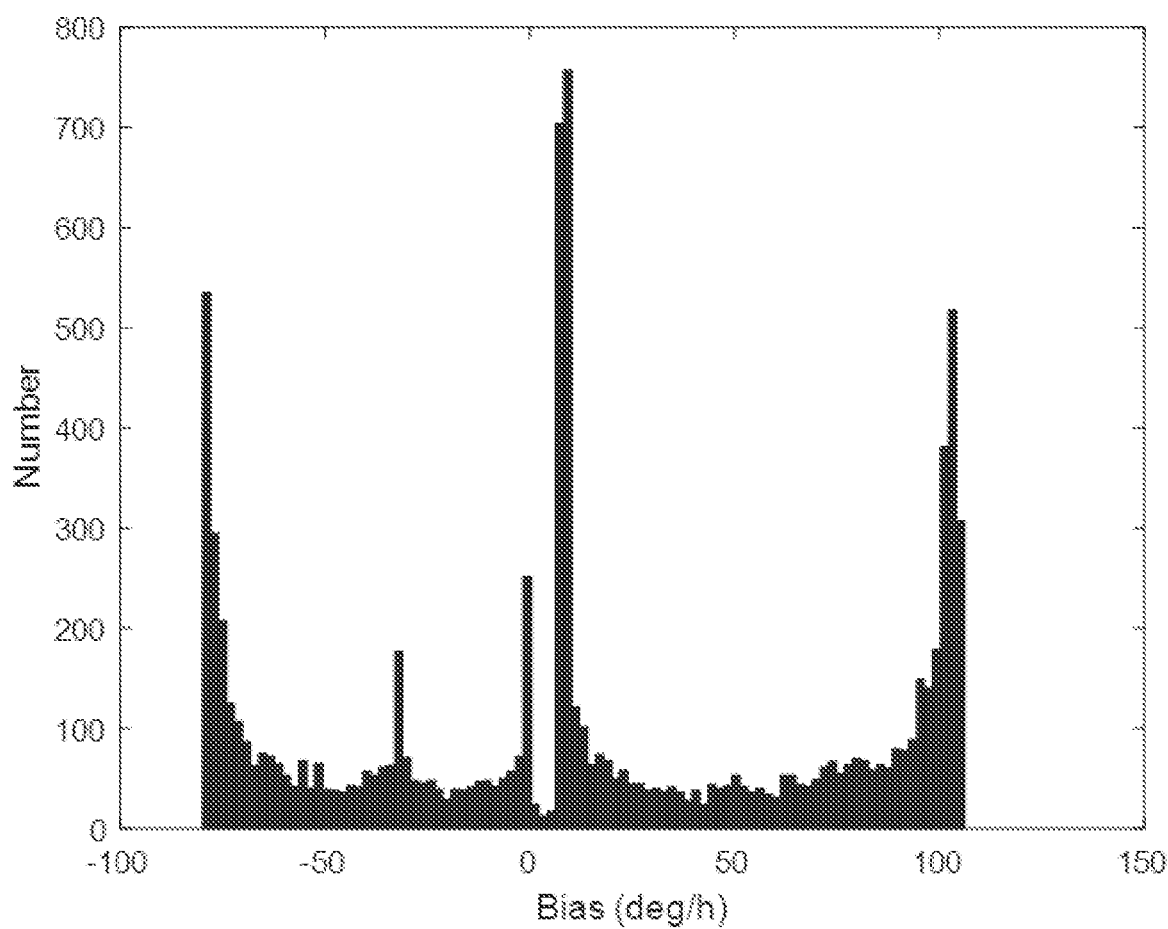
FIG. 5A is an original bias error output distribution diagram.
Figure 5B:
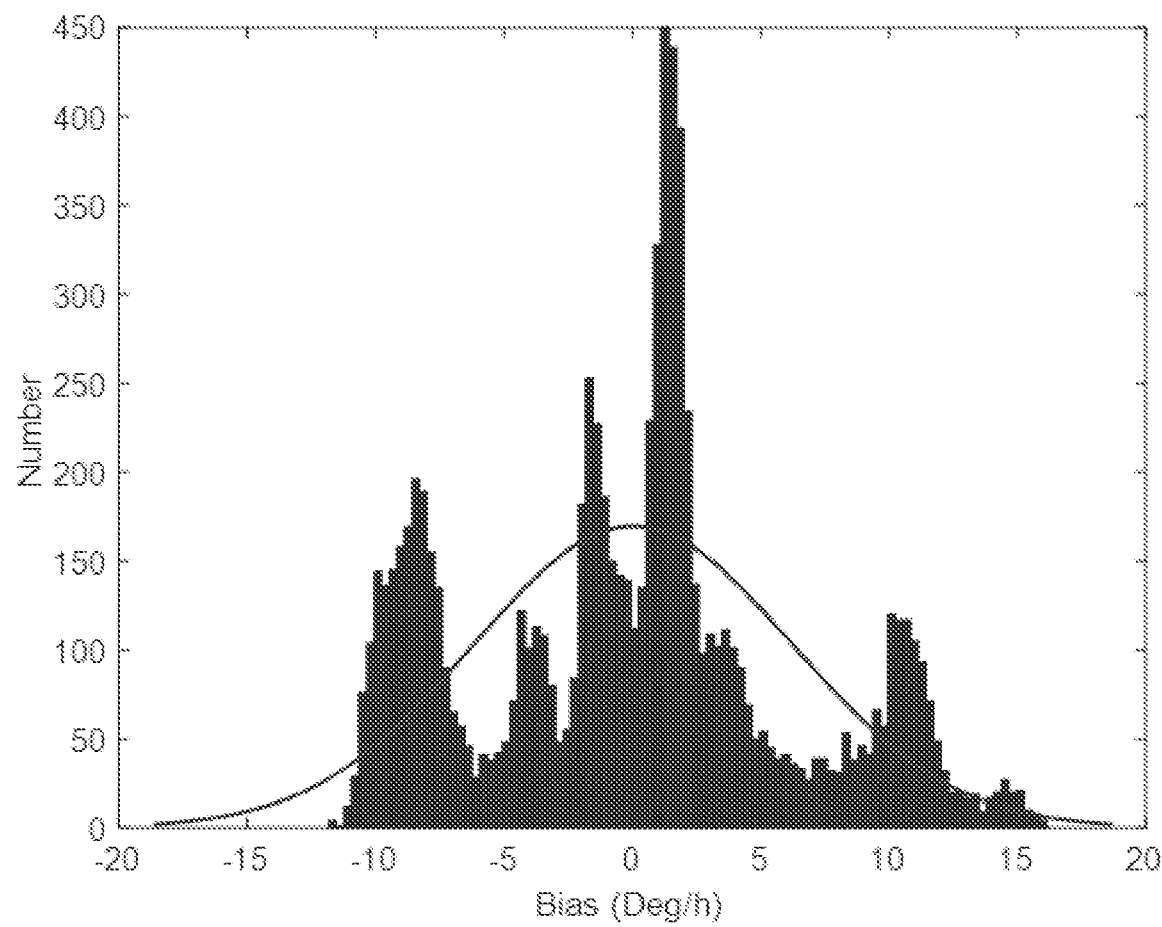
FIG. 5B is a bias error distribution diagram after single compensation.
Figure 5C:
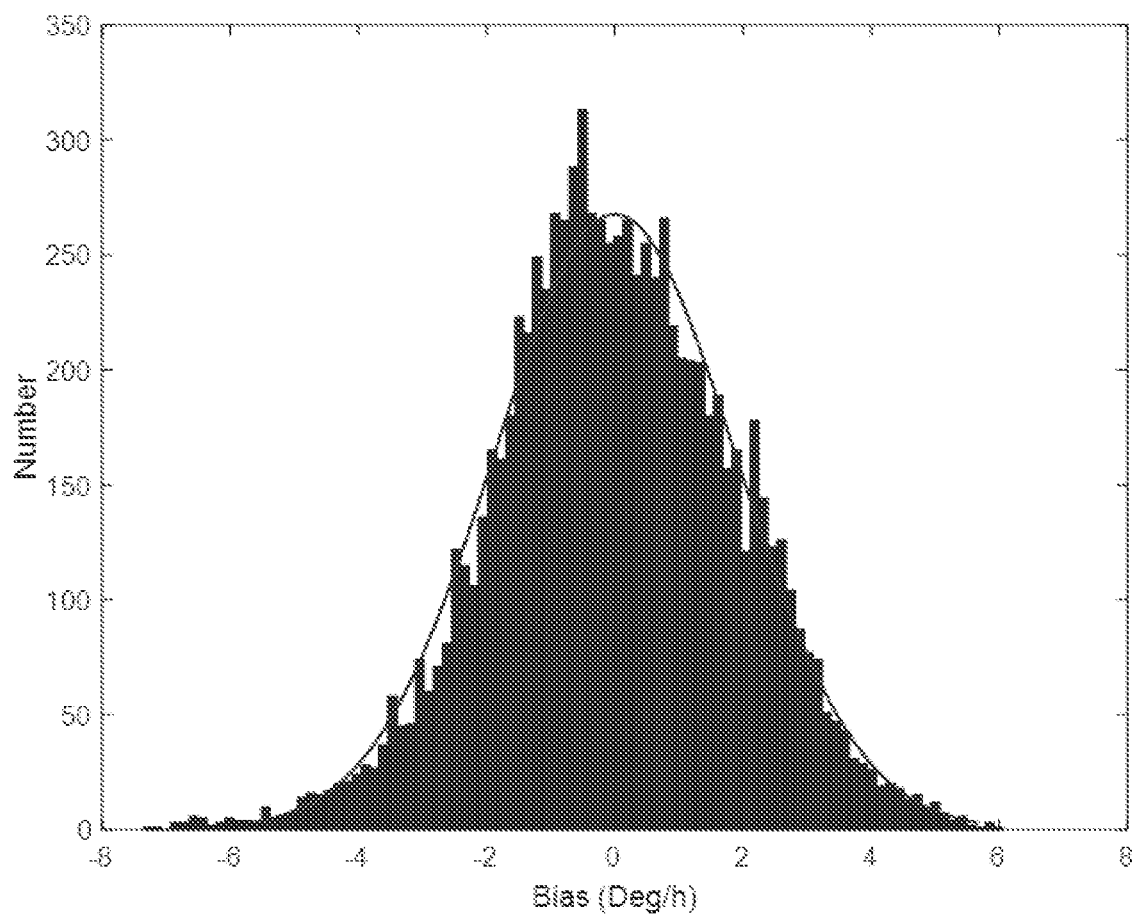
FIG. 5C is a bias error distribution diagram after comprehensive compensation.

The accuracy and effectiveness of compensation can also be interpreted through the distribution map of the output of the gyroscope. FIG. 5(a) is the original gyroscope output, and FIG. 5(b) is the output distribution map after single temperature compensation. After single compensation, the output of the gyroscope still has the influence of non-Gaussian characteristics, that is, there are physical factors affecting the bias error that have not been "excavated". The distribution map after comprehensive compensation is drawn as shown in FIG. 5(c), which shows ideal Gaussian distribution characteristics, thereby proving the effectiveness of compensation.

Figure 6:
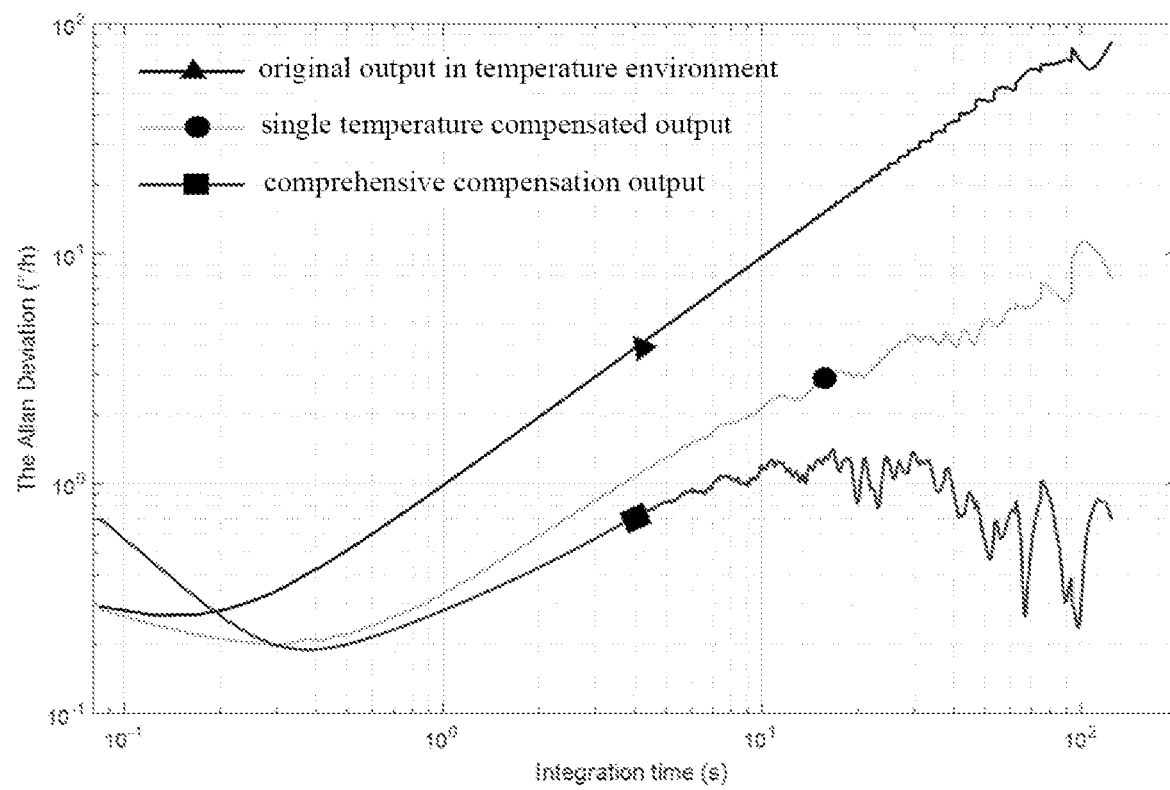
FIG. 6 is an Allan variance comparison chart under a temperature-changing environment of a gyroscope.

The Allan variances of the gyro bias before compensation, after single temperature compensation and after comprehensive parameter compensation are plotted respectively, as shown in FIG. 6.

It can be seen from FIG. 6 that, without any compensation, the bias instability value at 0.15 s reaches 0.28 deg/h, and a rate ramp with a slope of +1 is generated at a time constant of 0.4 s. Under single temperature compensation, the bias instability increases to 0.2 deg/h, and the "bottom out" maintaining time is prolonged, and part of the rate slope trend is compensated. When the full parameter variable compensation is used, the rate slope drift is almost eliminated, and the Allan variance value in the whole sampling time is ensured to be less than 1.4 deg/h.

This method is very valuable for a GMD continuous measurement mode. Without considering Schuler tuning, the measurement accuracy of the inertial instrument's azimuth keeping can be expressed as:

$$\psi \propto \psi_0 + k\!\int\!\varepsilon(t)dt \quad (3)$$

In Equation (3), $\psi_0$ refers to the azimuth accuracy of the initial alignment, and $\varepsilon(t)$ refers to the drift error of the gyroscope. After the initial azimuth alignment on the static base is completed, keeping the good bias stability of the gyroscope is the guarantee of realizing the azimuth accuracy of GMD continuous measurement since the continuous measurement is in a temperature-changing environment.

Static Azimuth Measurement

Firstly, an error model of the inertial instrument is given:
1) error model analysis:

Firstly, the error model of the inertial instrument is given. Under a static base, a scale factor error and an installation error are ignored, and the output model of a gyro in a body coordinate system can be expressed as:

$$\tilde{\omega}^b = \omega^b + \varepsilon_0 + \varepsilon_r + \varepsilon_w \quad (4)$$

wherein, $\tilde{\omega}^b$ is the average value of the sampling output of a gyroscope, $\omega^b$ is the true angular rate input value of the gyroscope, $\varepsilon_0$ is a constant drift of the gyroscope, $\varepsilon_r$ is a slow drift, and $\varepsilon_w$ is a fast drift.

According to the concept of Allan variance, $\varepsilon_0$ is mainly the repeatability error, which can be expressed by a random constant, and its error model is:

$$\dot{\varepsilon}_0 = 0 \quad (5)$$

The slow drift $\varepsilon_r$ represents the trend term of the gyroscope and represents the rate ramp term in Allan variance, which can usually be described by the first-order Markov process, namely:

$$\dot{\varepsilon}_r = -\frac{1}{\tau_g}\varepsilon_r + w_r \quad (6)$$

In Equation (6), $\tau_g$ is the correlation time of a Markov process, and $W_r$ is white noise.

The Allan variance of a high-temperature gyroscope prototype is available. Through comprehensive error compensation, the time-related trend term error of the gyroscope is suppressed, and the Allan variance of the gyroscope can be kept for a long time after "bottom out". Therefore, in fact, the Markov correlation time is long and can be ignored in alignment time. The output model of the gyroscope can be simplified as follows:

$$\tilde{\omega}^b = \omega^b + \varepsilon_0 + \varepsilon_w \quad (7)$$

wherein, the bias error of the gyroscope is:

$$\varepsilon = \varepsilon_0 + \varepsilon_w \quad (8)$$

Usually, the term $\varepsilon_w$ related to white noise is expressed by the angle random walk coefficient ARW.

Similarly, the output model of the accelerometer can be simplified as:

$$\tilde{f}^b = f^b + \nabla_0 + \nabla_w \quad (9)$$

wherein, $\tilde{f}^b$ is the average value of the sampling output of the accelerometer, $f^b$ is the real acceleration value of the accelerometer, $\nabla_0$ is the constant drift of the accelerometer and $\nabla_w$ is the random error of white noise.

$\nabla_0$ is mainly the repeatability error of the accelerometer, which can also be expressed by a random constant, and its error model is:

$$\dot{\nabla}_0 = 0 \quad (10)$$

The bias error of the accelerometer is defined as:

$$\nabla = \nabla_0 + \nabla_w \quad (11)$$

The term $\nabla_w$ related to white noise is usually expressed by the power spectral density (PSD) within a certain bandwidth of the accelerometer.

Gyro-guidance is based on the principle of Gyrocompass, which mainly uses inertial devices (accelerometers and gyroscopes) to measure the angular rate vector of the earth rotation and the acceleration vector of gravity, so as to calculate the included angle between the carrier and the geographical north.

$\omega_{ie}$ is the earth rotation angular rate, with a fixed value of 15.041067°/h (about 0.0042°/s). The longitude and latitude of the measured carrier are respectively $\lambda$ and $L$. The geographic coordinate system of "East-North-Up" is adopted.

The horizontal component of the angular rate of the earth rotation is $\omega_N$, and its magnitude depends on the latitude L of the measuring place:

$$\omega_N = \omega_{ie} \cos L$$

For example, the latitude of Beijing is roughly 40°, and the horizontal component of the earth rotation is about 11.52°/h. The higher the latitude, the smaller the horizontal component, and the horizontal component tends to zero near the pole position.

Assuming that the sensing axis of the gyroscope is in phase coincidence with the moving direction of the carrier, and the azimuth angle is defined as the included angle between the sensing axis of the gyroscope and the north direction, the output value of the gyroscope is obtained as follows:

$$\omega_{ob} = \omega_N \cos \psi + B = \omega_{ie} \cos L \cos \psi + B \quad (12)$$

In Equation (12), $\omega_{ob}$ is the output value of the gyroscope, that is, the observed value, and B is the bias of the gyroscope.

Figure 7:
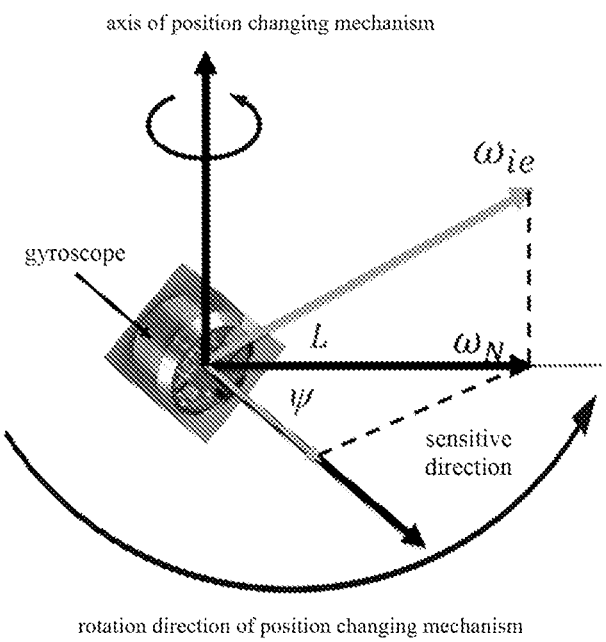
FIG. 7 shows the principle of eliminating a zero-position by changing the position of a single-axis gyroscope.

By solving Equation (12), the azimuth angle $\psi$ of the carrier can be calculated. In addition, it can be seen from Equation (12) that the measured data of the gyroscope contains the bias B of gyroscope itself, and its value will directly affect the calculation result of the azimuth angle, which is usually eliminated by multi-point index or continuous rotation modulation. FIG. 7 shows the working principle of a single-axis gyroscope for changing its sensing direction through the rotation of a position changing mechanism. In order to facilitate the mechanical design of the position changing mechanism, a simple 0-degree and 180-degree position changing method is adopted, and the outputs of the gyroscope are respectively:

$$\omega_{ob}(0) = U_1/SF_1 = \omega_{ie} \cos L \cos \psi + B_1 \quad (13)$$

$$\omega_{ob}(180) = U_2/SF_2 = -\omega_{ie} \cos L \cos \psi + B_2 \quad (14)$$

In Equations (13) and (14), $SF_1$, $SF_2$, $U_1$, $U_2$, $B_1$ and $B_2$ respectively refer to the scale factor, output (analog or digital quantities) and bias of the gyroscope at 0° and 180° positions.

By setting the north-seeking accuracy of GMD to 1°, and ignoring the scale factor error of the gyroscope, the azimuth measurement of the single-axis gyroscope can be estimated as follows from (13) and (14):

$$\hat{\psi} = \arccos \frac{\omega_{ob}(0) - \omega_{ob}(180)}{\omega_N \cos \psi} = \arccos\left(\cos \psi + \frac{\varepsilon_B}{\omega_N \cos \psi}\right) \quad (15)$$

In Equation (15), $\varepsilon_B$ is the residual drift error after position changing compensation. By taking Taylor expansion of the above equation and ignoring the high-order term, the estimation error (precision) at two positions is obtained as follows:

$$\delta\psi \approx \frac{\varepsilon_B}{\omega_N \sin \psi} \quad (16)$$

It can be seen from Equation (16) that when a single gyro is used for two-position change, the estimation error is the smallest when the two positions to be changed are selected near the east-west direction ($\psi_1 = 90°, 270°$), and the estimation error at this time is as follows:

$$\delta\psi = \frac{\varepsilon_B}{\omega_N} = \frac{\varepsilon_B}{\omega_{ie}\cos L} \quad (17)$$

Equation (17) gives the basic equation of a gyro north-seeking estimation accuracy error. It can be seen that the north-seeking accuracy of two-position change is related to the gyro residual drift error and local latitude.

2) Coarse Alignment and Fine Alignment:

Because the geographical location of the drilling construction site is known, the component of the angular rate vector of the earth rotation in the geographical coordinate system and the gravity vector can be accurately obtained at this time, as follows:

$$\omega_{ie}^n = \begin{bmatrix} 0 \\ \omega_{ie}\cos L \\ \omega_{ie}\sin L \end{bmatrix} = \begin{bmatrix} 0 \\ \omega_N \\ \omega_U \end{bmatrix}, g^n = \begin{bmatrix} 0 \\ 0 \\ -g \end{bmatrix} \quad (18)$$

wherein, g, $\omega_{ie}$ and L respectively represent the local gravity acceleration, the earth rotation angular rate and the local latitude, and it is noted that the north component of the earth rotation angular rate satisfies the relationship of $\omega_N = \omega_{ie} \cos L$ and the sky component of the earth rotation angular rate satisfies the relationship of $\omega_U = \omega_{ie} \sin L$.

In the process of coarse alignment on a static base, the gyro and accelerometer in a GMD system measure the projections of the gravity vector and the earth rotation angular rate under the body coordinate system. By ignoring the influence of mud sloshing interference, the measured values of a three-component gyro and three-component acceleration on the carrier are as follows:

$$\tilde{\omega}_{ib}^b = \hat{C}_n^b \omega_{ie}^n \quad (19)$$

$$\tilde{f}^b = -\hat{C}_n^b g^n \quad (20)$$

wherein, $$\tilde{\omega}_{ib}^b = [\tilde{\omega}_x, \tilde{\omega}_y, \tilde{\omega}_z]^T, \tilde{f}^b = [\tilde{f}_x, \tilde{f}_y, \tilde{f}_z]^T \quad (21)$$

Coarse alignment time is generally very short, and the measured value of the inertial instrument is usually taken as a smoothed average value within a period of time. When the inertial instrument has no obvious trend term drift error, the longer the smoothing time is, the better the accuracy can be obtained. Considering the coarse alignment time and alignment accuracy comprehensively, the smoothing time can be judged and analyzed by Allan variance test data, and the optimal time for smoothing is based on the time when the Allan variance "bottoms out".

From Equation (20), the pitch angle can be obtained:

$$\hat{\theta} = a\tan 2(\tilde{f}_y, \sqrt{\tilde{f}_x^2 + \tilde{f}_z^2}) \quad (22)$$

The roll angle is obtained:

$$\hat{\gamma} = a\tan 2(-\tilde{f}_x, \tilde{f}_z) \quad (23)$$

On the basis of obtaining the $\hat{\theta}$ and $\hat{\gamma}$, the two values are substituted into Equation (19):

$$\begin{bmatrix} \cos\hat{\gamma} & 0 & \sin\hat{\gamma} \\ \sin\hat{\theta}\sin\hat{\gamma} & \cos\hat{\theta} & -\cos\hat{\gamma}\sin\hat{\theta} \\ -\sin\hat{\gamma}\cos\hat{\theta} & \sin\hat{\theta} & \cos\hat{\gamma}\cos\hat{\theta} \end{bmatrix} \begin{bmatrix} \tilde{\omega}_x \\ \tilde{\omega}_y \\ \tilde{\omega}_z \end{bmatrix} = \begin{bmatrix} -\sin\hat{\psi}\omega_{ie}\cos L \\ \cos\hat{\psi}\omega_{ie}\cos L \\ \omega_{ie}\sin L \end{bmatrix} \quad (24)$$

The heading angle is solved as:

$$\hat{\psi} = a\tan\_2(\bar{\omega}_x \cos\hat{\gamma} + \bar{\omega}_z \sin\hat{\gamma}, \bar{\omega}_x \sin\hat{\theta}\sin\hat{\gamma} + \bar{\omega}_y \cos\hat{\theta} - \bar{\omega}_z \cos\hat{\gamma}\sin\hat{\theta}) \quad (25)$$

Equations (22), (23), and (25) constitute the basic algorithm of Euler angle coarse alignment. The limit accuracy of Euler analytical method for static base alignment is analyzed below.

The bias errors of the accelerometer and gyroscope are taken into consideration:

$$\nabla^n = C_b^n \nabla^b \quad \varepsilon^n = C_b^n \varepsilon^b \quad (26)$$

In Equation (26), $\nabla^b$ and $\nabla^n$ respectively represent the bias errors of an accelerometer under a body coordinate system and a navigation coordinate system, and $\varepsilon^b$, $\varepsilon^n$ respectively represent the bias errors of a gyroscope under a body coordinate system and under a navigation system.

In order to solving the differential of one direction, the angles of the other two directions are made to zero, the two sides of (22), (23) and (25) are differentiated respectively and the second-order small quantity is ignored, the following equations are obtained:

$$\phi_E = -\delta\theta = -\frac{\cos\theta \nabla_y - \sin\theta \nabla_z}{g} = -\frac{\nabla_N}{g} \quad (27)$$

$$\phi_N = -\delta\gamma = \frac{\cos\gamma \nabla_x + \sin\gamma \nabla_y}{g} = -\frac{\nabla_E}{g} \quad (28)$$

$$\phi_U = \delta\psi = -\frac{\sin\psi(\varepsilon_y - \delta\theta\omega_U) + \cos\psi(\varepsilon_x + \delta\gamma\omega_U)}{\omega_N} = \frac{-\varepsilon_E + \phi_N \omega_U}{\omega_N} = -\frac{\varepsilon_E}{\omega_N} + \frac{\nabla_E}{g}\tan L \quad (29)$$

Equations (27), (28) and (29) determine the limit accuracy of static base alignment. The attitude alignment accuracy under a static base mainly depends on the drift error of the accelerometer in east and north, while the azimuth alignment accuracy mainly depends on the drift error of the gyro in east and the drift error of the accelerometer in east.

Thereinto, the two-position analytical expression is aligned:

It is assumed that the constant bias of the inertial instrument is constant before and after changing the position, and the interference of angular motion and linear motion before and after rotation is ignored. By rotating an IMU around one direction, an attitude transition matrix in two positions is constructed, and the observability of a constant bias is increased. In practical applications, due to limitation by the size of the inertial instrument and the size characteristics of a slender rod of a GMD probe tube, the design of a position changing mechanism can only be around the axial direction of the probe tube, that is, around the input axis direction of a Z-axis gyroscope.

The positions of the gyroscope before and after the position is changed are $b_1$ and $b_2$, and the average values of sampling outputs of corresponding gyroscopes in alignment time are $\bar{\omega}^{b1}$ and $\bar{\omega}^{b2}$, and the average values of sampling outputs of the accelerometer before and after the position is changed are $\bar{f}^{b1}$ and $\bar{f}^{b2}$, respectively. Assuming that the included angle between $b_1$ and $b_2$ is $\beta$, the constructed state transition matrix is $C_{b_1}^{b_2}$:

$$C_{b_1}^{b_2} = \begin{bmatrix} \cos\beta & -\sin\beta & 0 \\ \sin\beta & \cos\beta & 0 \\ 0 & 0 & 1 \end{bmatrix} \quad (3)$$

There is a relationship between the inertial instrument outputs of the position $b_1$ and the position $b_2$:

$$\omega^{b2} = C_{b_1}^{b2}\omega^{b1}, \quad f^{b2} = C_{b_1}^{b2} f^{b1} \quad (31)$$

Considering that the time of the position changing process is very short, the first-order Markov process in a random constant is ignored, and it is considered that the constant drift of the inertial instrument is unchanged before and after the position is changed, only the influence of the random drift is considered. In addition, because the gyroscope rotates around the Z axis, the sensing directions of the Z axis gyroscope and accelerometer are unchanged before and after the positions are changed, so the separation of the Z axis constant drift cannot be realized. When only the output of a horizontal axis inertial instrument is considered, $$C_{b_1}^{b_2} = \begin{bmatrix} \cos\beta & -\sin\beta \\ \sin\beta & \cos\beta \end{bmatrix}$$

From Equation (31), the output of a horizontal gyro at the position $b_2$ can be obtained as follows:

$$\begin{bmatrix} \bar{\omega}_x^{b2} \\ \bar{\omega}_y^{b2} \end{bmatrix} = C_{b_1}^{b_2} \begin{bmatrix} \omega_x^{b1} \\ \omega_y^{b1} \end{bmatrix} + \begin{bmatrix} \varepsilon_{0x} \\ \varepsilon_{0y} \end{bmatrix} + \begin{bmatrix} \bar{\varepsilon}_{xw2} \\ \bar{\varepsilon}_{yw2} \end{bmatrix} \quad (32)$$

Similarly, the output of the horizontal accelerometer at the position $b_2$ can be obtained as follows:

$$\begin{bmatrix} \bar{f}_x^{b2} \\ \bar{f}_y^{b2} \end{bmatrix} = C_{b_1}^{b_2} \begin{bmatrix} f_x^{b1} \\ f_y^{b1} \end{bmatrix} + \begin{bmatrix} \nabla_{0x} \\ \nabla_{0y} \end{bmatrix} + \begin{bmatrix} \bar{\nabla}_{xw2} \\ \bar{\nabla}_{yw2} \end{bmatrix} \quad (33)$$

Equations (32) and (33) can show that the constant drift of the horizontal inertial instrument can be separated theoretically at any slight rotation angle $\beta$, and when the rotation angle $\beta$ is 180°, $\det(I - C_{b_1}^{b2})$ is the largest, and the separation of the constant drift error is least affected by the random drift. The influence of the random drift in the position changing process is not considered, and at this time, the estimated value of the constant drift of the horizontal gyro is obtained as follows:

$$\begin{cases} \hat{\varepsilon}_x = \frac{1}{2}(\bar{\omega}_x^{b2} + \bar{\omega}_x^{b1}) \\ \hat{\varepsilon}_y = \frac{1}{2}(\bar{\omega}_y^{b2} + \bar{\omega}_y^{b1}) \end{cases} \quad (34)$$

The estimated value of the bias of a horizontal accelerometer is:

$$\begin{cases} \hat{\nabla}_x = \frac{1}{2}(\bar{f}_x^{b2} + \bar{f}_x^{b1}) \\ \hat{\nabla}_y = \frac{1}{2}(\bar{f}_y^{b2} + \bar{f}_y^{b1}) \end{cases} \quad (35)$$

The estimated value of the accelerometer after two-position calibration is obtained as follows:

$$\begin{cases} \hat{f}_x^b = \frac{1}{2}(\bar{f}_x^{b2} - \bar{f}_x^{b1}) \\ \hat{f}_y^b = \frac{1}{2}(\bar{f}_y^{b2} - \bar{f}_y^{b1}) \end{cases}$$

The estimated value of the gyroscope after two-position calibration is:

$$\begin{cases} \hat{\omega}_x^b = \frac{1}{2}(\bar{\omega}_x^{b2} - \bar{\omega}_x^{b1}) \\ \hat{\omega}_y^b = \frac{1}{2}(\bar{\omega}_y^{b2} - \bar{\omega}_y^{b1}) \end{cases}$$

However, the accelerometer and gyroscope of the Z axis are unobservable, so the average value before and after the positions are changed is directly taken as the estimated value after calibration:

$$\begin{cases} \hat{f}_z^b = \frac{1}{2}(\bar{f}_z^{b2} + \bar{f}_z^{b1}) \\ \hat{\omega}_z^b = \frac{1}{2}(\bar{\omega}_z^{b2} + \bar{\omega}_z^{b1}) \end{cases}$$

According to the estimated values of the gyroscope and accelerometer after calibration, the calibrated well inclination angle can be obtained by using the analytical coarse alignment principle similar to a single-position Euler angle:

$$\hat{\theta} = a\tan 2(\hat{f}_y^b, \sqrt{(\hat{f}_x^b)^2 + (\hat{f}_z^b)^2}) \tag{36}$$

The calibrated tool face angle is:

$$\hat{\gamma} = a\tan 2[-\hat{f}_x^b, (\bar{f}_z^{b2} + \bar{f}_z^{b1})] \tag{37}$$

The calibrated azimuth angle is:

$$\hat{\psi} = a\tan 2(\hat{\omega}_x^b \cos\hat{\gamma} + \hat{\omega}_z^b \sin\hat{\gamma}, \hat{\omega}_x^b \sin\hat{\theta}\sin\hat{\gamma} + \hat{\omega}_y^b \cos\hat{\theta} - \hat{\omega}_z^b \cos\hat{\gamma}\sin\hat{\theta}) \tag{38}$$

Equations (36)-(38) constitute the basic algorithm for analyzing two-position alignment by rotation of 180 degrees around the Z axis.

Analyzing two positions solves the problem of constant drift error calibration of the inertial instrument, and improves the alignment accuracy, especially the azimuth alignment accuracy. For small well inclination angle measurement, the main alignment error comes from the error of a position changing mechanism and the random drift error of the inertial instrument. Because of the design of changing the position by 0-180°, only the final positioning accuracy of changing the position is concerned, which is convenient for the design of the position changing mechanism. In practical applications, the positioning accuracy of changing the position can be improved by a mechanical stop structure design, which simplifies the design. With regard to the random drift error, assuming that the alignment time of each position is t, and the random walk coefficient of the gyroscope obtained by testing is N=0.005 deg/$\sqrt{h}$, the statistical mean square deviation σ in t time is 0.005 deg/$\sqrt{h}$/$\sqrt{t}$. If the total alignment time is set as 300 s, and it is assumed that the alignment time at each position is 145 s, the gyroscope random error caused by this is about $s_w$=0.017 deg/h. For the quartz flexible accelerometer with noise of 2 μg/$\sqrt{Hz}$, the mean square value of the random error is 20 μg in the frequency band of 100 Hz. According to the analytical equation of the accuracy limit of azimuth alignment of the Euler analytic method, by setting the latitude as 40° N, the azimuth error caused by the random error is about 0.1 deg.

In another embodiment, a four-position changing suppression method can be used:

In the Gyro Compass mode, the single gyroscope north seeking mode is adopted, that is, an X-direction gyroscope senses the horizontal component of ground velocity, and an X-accelerometer is used to measure the well inclination angle. In order to eliminate the zero-position error of the gyroscope, a Z-axis gyroscope is used to control the position changing mechanism and perform four-position changing control. The accelerometer and gyroscope outputs of the X-axis are collected at four positions of 0°, 90°, 180° and 270° respectively, the position changing time is set to be short, and the constant bias of the X-axis gyroscope remains unchanged. The gyroscope outputs at four positions are respectively as follows:

$$\omega^{P1} + \cos\psi\omega_N + b_0 + \varepsilon_1$$

$$\omega^{P2} + \sin\psi\omega_N + b_0 + \varepsilon_2$$

$$\omega^{P3} + \cos\psi\omega_N + b_0 + \varepsilon_3$$

$$\omega^{P4} + \sin\psi\omega_N + b_0 + \varepsilon_4 \tag{39}$$

In Equation (39), $\omega^{P1-4}$ refers to the measured values of the gyroscope at four positions, ψ is the included angle between the fixed position of the probe tube and the geographical north direction, and is also the physical quantity that needs to be solved in practice. $\omega_N$ refers to the horizontal component of the angular rate of the earth rotation, $b_0$ is a constant bias, $\varepsilon_{1-4}$ indicates the random drift of the gyroscope at four positions. By comprehensive using the measurement results of four positions, and assuming that the random drift is a small quantity, the north angle is obtained as:

$$\psi = \arctan\frac{\omega^{P2} - \omega^{P4}}{\omega^{P1} - \omega^{P3}} \tag{40}$$

Also, through the outputs of the accelerometers at four positions, the well inclination angle can be calculated, which can be used as the compensation of the north angle in the direction of the well inclination angle. By considering the well inclination angle of the probe tube comprehensively, the following is obtained:

$$\psi = \arctan\frac{\omega^{P2} - \omega^{P4} - 2K_{SF}\sin\gamma\cos\theta\omega_N}{\omega^{P2} - \omega^{P2} - 2K_{SF}\sin\theta\omega_N} \times \frac{\cos\theta}{\cos\gamma} \tag{41}$$

In the above equation, θ and γ refer to the horizontal attitude angles, and $K_{SF}$ is the scale factor of the gyroscope.

Kalman Filtering:

A navigation coordinate system is taken as the East-North-Up geographic coordinate system, and a 12-dimensional precision alignment mathematical model of an inertial navigation system is established. The state variable of a Kalman filter is as follows:

$$X = [(\delta v^n)^T (\phi^n)^T (\varepsilon_0^b)^T (\nabla_0^b)^T]^T \tag{42}$$

In Equation (42), there are: a velocity error $\delta v^n$, a mathematical platform misalignment angle $\phi^n$ of strapdown inertial navigation, a high-temperature gyro constant drift $s_0^b$ and a high-temperature accelerometer constant bias $\nabla_0^b$, $s_0^b$ and $\nabla_0^b$ are mainly caused by the repeatability error of successive start-up of high-temperature inertial instruments.

According to the error model of the strapdown inertial navigation system under a static base, by ignoring a small amount of errors, the state equation can be obtained as follows:

$$\dot{X} = FX + W \quad (43)$$

In the above equation, $$F = \begin{bmatrix} 0_{3\times3} & f^n \times & 0_{3\times3} & C_b^n \\ 0_{3\times3} & -\omega_w^n \times & -C_b^n & 0_{3\times3} \\ 0_{3\times3} & 0_{3\times3} & 0_{3\times3} & 0_{3\times3} \\ 0_{3\times3} & 0_{3\times3} & 0_{3\times3} & 0_{3\times3} \end{bmatrix}, W = \begin{bmatrix} C_b^n \nabla_w^b \\ -C_b^n \varepsilon_w^b \\ 0_{3\times1} \\ 0_{3\times1} \end{bmatrix} \quad (42)$$

In Equation (44), $\nabla_w^b$ and $\varepsilon_w^b$ are the random white noises in the body coordinate system (b system) of the accelerometer and gyro, respectively. After comprehensive temperature compensation and elimination of the Warm-up factor, the output of the inertial instrument can be characterized as zero-mean normal distribution. In practical applications, Allan variance is usually used to solve each model coefficient as a priori value of the model estimation of the inertial instrument.

When the static base of a GMD system is aligned, the carrier is stationary, and the output speed $v^n$ of the navigation solution is the speed error $\delta v^n$. If $\delta v^n$ is taken as the measured value, the measurement equation is:

$$Z_v = \delta v^n = [0_{3\times3} I_{3\times3} 0_{3\times3} 0_{3\times3}] X + V_v \quad (45)$$

wherein, $V_V$ is the velocity measurement noise in the navigation coordinate system.

By using the standard Kalman optimal estimation, the platform misalignment angle (which can be converted into the azimuth angle, tool face angle and well inclination angle) of strapdown inertial navigation can be optimally estimated, and the bias drift of the inertial instruments can be estimated.

Continuous Measurement while Drilling Method

The method is described as follows: a method for refining the continuous azimuth measurement, which is divided into MCM for MWD and AHRS for wireline well trajectory measurement.

Figure 8:
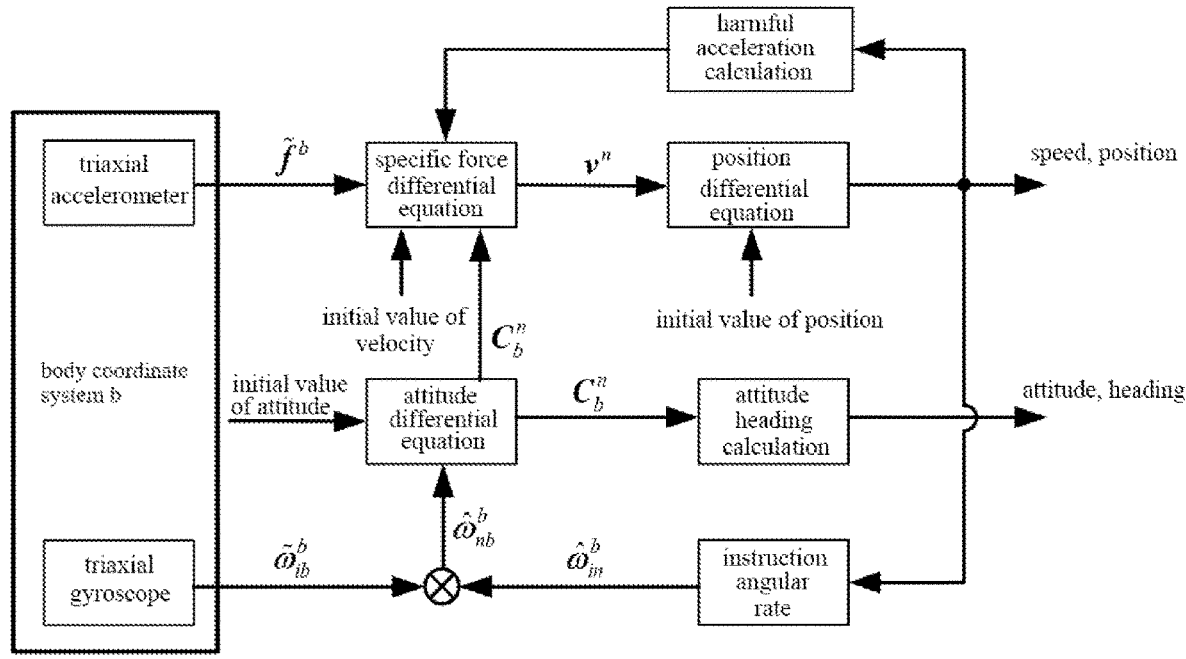
FIG. 8 is a schematic diagram of the principle of strapdown inertial navigation.

1) AHRS is applied to a wireline logging mode, and the basic principle of the strapdown inertial measurement system is shown in FIG. 8. On the basis of static azimuth measurement, the initial azimuth, well inclination angle and tool face angle are obtained, from which the initial value of an attitude matrix is obtained:

the b system is fixedly connected with an IMU (an inertial measurement unit) and rotates with the carrier, the origin is located at the sensing center of the IMU position, which is expressed by $ox_b, y_b, z_b$, and the angular position relationship between the b system and the n system is expressed by an attitude matrix $C_n^b$. The attitude transfer matrix between the navigation coordinate system and the body coordinate system is as follows:

$$C_b^n = \begin{bmatrix} \cos\psi\cos\phi + \sin\psi\sin\theta\sin\phi & \sin\psi\cos\theta & \cos\psi\sin\phi - \sin\psi\sin\theta\cos\phi \\ -\sin\psi\cos\phi + \cos\psi\sin\theta\sin\phi & \cos\psi\cos\theta & -\sin\psi\sin\phi - \cos\psi\sin\theta\cos\phi \\ -\cos\theta\sin\phi & \sin\theta & \cos\theta\cos\phi \end{bmatrix} \quad (46)$$

In Equation (46), $\psi$, $\theta$ and $\phi$ are the azimuth angle, the well inclination angle and the tool face angle respectively, which correspond to the heading angle, the pitch angle and the roll angle in the inertial navigation field. For directional drilling survey application, the azimuth angle is defined as the included angle between the due north direction and the horizontal projection direction of a borehole, that is, the angle rotated from the due north direction to the horizontal projection direction of the borehole in a clockwise direction; the well inclination angle is the included angle between a borehole axis and the gravity vector; and the tool face angle is the angle rotated clockwise by the oblique mouth of the instrument relative to a high side of the borehole when looking down the borehole, indicating the rotation of the instrument itself. Generally, the well inclination angle and the tool face angle are collectively referred to as an attitude angle.

2) Well trajectory fitting algorithm under MCM measurement while drilling:

For continuous measurement while drilling, the well trajectory can be calculated and fitted by way of MCM through a continuous point measurement method. The algorithm is as follows:

As for a GMD position updating algorithm, usually after obtaining the attitude information (the azimuth angle, well inclination angle and tool face angle), the 3D borehole trajectory information is obtained by a Minimum Curvature Method (MCM). This method is based on the assumption that the trajectory between close measuring points is a smooth arc, and the trajectory curve between two points is fitted by obtaining the information of well inclination angle and azimuth at two close static positions. Its principle is shown in FIG. 9.

Figure 9:
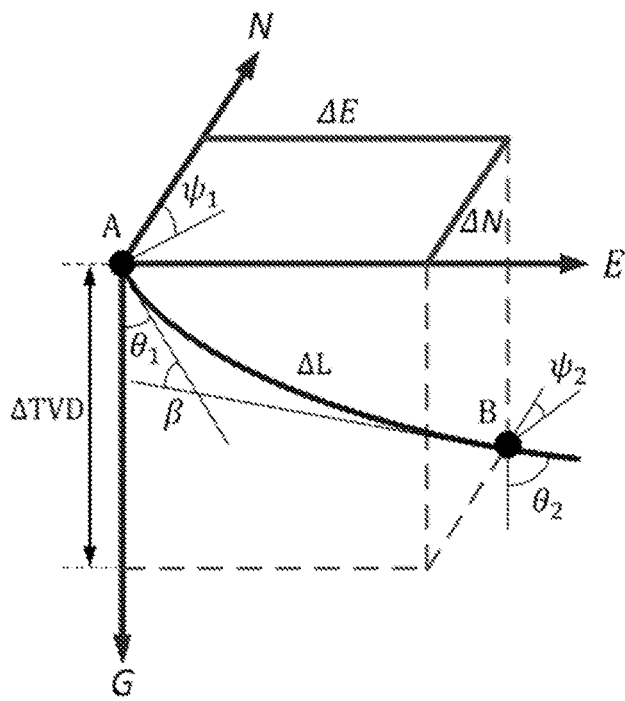
FIG. 9 is a schematic diagram of trajectory measurement with the minimum curvature method.

In FIG. 9, a point A and a point B respectively correspond to two static measurement points of the well trajectory, and the corresponding information about the well inclination angle and azimuth angle measured by GMD is $\theta_1$, $\psi_1$ and $\theta_2$, $\psi_2$ respectively. The arc length $\Delta L$ of the well trajectory can be measured, so that the curvature $\beta$ and curvature coefficient RF of this well trajectory can be obtained, and the depth increment $\Delta$TVD and horizontal displacement increment $\Delta$E and $\Delta$N of the point B relative to the point A can be further obtained, so that the position of the point B can be determined. The related calculation equation is shown in Equation (47):

$$\beta = \arccos(\cos(\theta_2 - \theta_1) - \sin\theta_1 \sin\theta_2(1 - \cos(\psi_2 - \psi_1)))$$

$$RF = 2\tan(\beta/2)/\beta$$

$$\Delta TVD = \tfrac{1}{2}\Delta L(\cos\theta_1 + \cos\theta_2)RF$$

$$\Delta N = \tfrac{1}{2}\Delta L(\sin\theta_1 \cos\psi_1 + \sin\theta_2 \cos\psi_2)RF$$

$$\Delta E = \tfrac{1}{2}\Delta L(\sin\theta_1 \sin\psi_1 + \sin\theta_2 \sin\psi_2)RF \quad (47)$$

The MCM method establishes the calculation method from static attitude and orientation information to continuously measured position information, and also realizes the unification of the GMD from attitude and orientation measurement in a static mode to well trajectory measurement in a continuous mode.

The embodiments of this application are described in detail above. For example, some words are used in the description and claims to refer to specific components. It should be understood by those skilled in the art that hardware manufacturers may use different nouns to refer to the same component. In this description and claims, differences in names are not used as a way to distinguish components, but differences in functions of components are used as a criterion to distinguish components. As "include" and "comprise" mentioned in the whole description and claims are open terms, they should be interpreted as "include/comprise but not limited to". "Generally" means that within the acceptable error range, those skilled in the art can solve the technical problem within a certain error range and basically achieve the technical effect. The following description of the description is a preferred embodiment for implementing this application, but the description is for the purpose of explaining the general principles of this application, and is not intended to limit the scope of this application. The claimed scope of this application shall be as defined in the appended claims.

It should be understood that the term "and/or" used in this paper is only a description of the association relationship of associated objects, which means that there can be three kinds of relationships, for example, A and/or B, which can mean that A exists alone, A and B exist at the same time, and B exists alone. In addition, the character "/" in this paper generally indicates that the context objects are in an "or" relationship.

The above description shows and describes several preferred embodiments of the application, but as mentioned above, it should be understood that the application is not limited to the form disclosed herein, and should not be regarded as excluding other embodiments, but can be used in various other combinations, modifications and environments, and can be changed by the above teaching or the technology or knowledge in relevant fields within the scope of the application conception described herein. However, the modifications and changes made by those skilled in the art do not depart from the spirit and scope of this application, and should be within the protection scope of the appended claims of this application.

What is claimed is:

1. A gyro measurement while drilling system, comprising:
   a sensor combination unit comprising a strapdown inertial unit and a vibration and shock acquisition sensor, the strapdown inertial unit comprising a gyroscope and an accelerometer fixedly connected in a probe tube, wherein the gyroscope is a Coriolis vibration gyroscope;
   a filtering and level conversion module, configured to perform filtering and level conversion for an output signal of the strapdown inertial unit and for an output signal of the vibration and shock acquisition sensor, and wherein the filtering and level conversion module outputs a result to a data acquisition and data communication module;
   the data acquisition and data communication module, configured to acquire output data of the filtering and level conversion module and output processed related data to a navigation computer according to a working mode instruction received from the navigation computer;
   a driving mechanism, configured to receive a control instruction from a driving control module and drive the strapdown inertial unit to rotate;
   the driving control module, configured to respond to a control mode of the data acquisition and data communication module and send out the control instruction for driving the driving mechanism; and
   the navigation computer, configured to output the working mode instruction to the data acquisition and data communication module according to the received control instruction, calculate and process relevant data, and output a processing result, wherein the output signal of the strapdown inertial unit comprises an internal parameter signal of the gyroscope, and the internal parameter signal comprises a temperature of an inertial instrument, a temperature of a circuit, vibration amplitude of the gyroscope, a resonance frequency of the gyroscope, and a quadrature coupling output signal of the gyroscope.

2. The gyro measurement while drilling system according to claim 1, wherein the Coriolis vibration gyroscope is fully symmetrical.

3. The gyro measurement while drilling system according to claim 1, wherein the measurement while drilling system further comprises an angle measuring unit configured to measure a rotation angle of the strapdown inertial unit.

4. The gyro measurement while drilling system according to claim 1, wherein the vibration and shock acquisition sensor is configured to acquire vibration and shock signals in a working process of the measurement while drilling system in real time and monitor a working state of the measurement system.

5. The gyro measurement while drilling system according to claim 1, wherein the modules used for calculation and processing of related data in the navigation computer comprises a full parameter compensation module, an initial alignment module and a continuous measurement while drilling module.

6. The gyro measurement while drilling system according to claim 5, wherein the full parameter compensation module is configured to compensate a drift error of the gyroscope or the accelerometer caused by temperature and vibration, by collecting multiple observation points inside the gyroscope and the accelerometer, through error modeling and a related algorithm.

7. The gyro measurement while drilling system according to claim 5, wherein the initial alignment module is configured to sense respectively earth rotation angular rate information and gravity acceleration information by the gyroscope and the accelerometer under a static base of the measurement system, calculate initial values of an azimuth angle, a well inclination angle and a tool face angle through a coarse alignment algorithm, and then calculate the azimuth angle, the well inclination angle and the tool face angle of Gyro Measurement while Drilling (GMD) through an optimal estimation algorithm combined with external auxiliary information.

8. The gyro measurement while drilling system according to claim 5, wherein the continuous measurement while drilling module is configured to output information about an azimuth angle, a well inclination angle and a tool face angle in real time when the measurement while drilling system works continuously through a relevant algorithm, based on the azimuth angle, the well inclination angle and the tool face angle calculated by the initial alignment module.

9. A gyro measurement while drilling system, comprising:
   a sensor combination unit comprising a strapdown inertial unit and a vibration and shock acquisition sensor, the strapdown inertial unit comprising a gyroscope and an accelerometer fixedly connected in a probe tube, wherein the gyroscope is a Coriolis vibration gyroscope;
   a filtering and level conversion module, configured to perform filtering and level conversion for an output signal of the strapdown inertial unit and for an output signal of the vibration and shock acquisition sensor, and wherein the filtering and level conversion module outputs a result to a data acquisition and data communication module;

the data acquisition and data communication module, configured to acquire output data of the filtering and level conversion module and output processed related data to a navigation computer according to a working mode instruction received from the navigation computer;

a driving mechanism, configured to receive a control instruction from a driving control module and drive the strapdown inertial unit to rotate;

the driving control module, configured to respond to a control mode of the data acquisition and data communication module and send out the control instruction for driving the driving mechanism; and the navigation computer, configured to output the working mode instruction to the data acquisition and data communication module according to the received control instruction, calculate and process relevant data, and output a processing result;

wherein the output signal of the strapdown inertial unit comprises an internal parameter signal of the gyroscope, and the internal parameter signal comprises a temperature of an inertial instrument, a temperature of a circuit, vibration amplitude of the gyroscope, a resonance frequency of the gyroscope, and a quadrature coupling output signal of the gyroscope;

wherein to calculate and process relevant data includes at least one of:
1) a full parameter variable compensation;
2) an initial alignment algorithm; and
3) a continuous measurement while drilling.

10. The gyro measurement while drilling system according to claim 9, wherein the full parameter variable compensation includes establishing a comprehensive model of a gyroscope bias related to temperature using an equation defined as:

$$B_0(T) = \Sigma k_{P_i} \times P^i + \Sigma k_{Q_i} \times Q^i + \Sigma k_{T_i} \times T^i + \Sigma k_{A_i} \times A^i,$$

then an estimated value of the gyroscope bias is as follows:

$$\hat{B} = B_r - B_0(T),$$

$B_0$ refers to a fitting modeling calculation value of a temperature-related comprehensive bias error, $B_r$ represents an original output of the gyroscope, $\hat{B}$ is an estimated value after a modeling error is eliminated, P represents an phase-locked control voltage of a resonator, Q is a demodulation value of quadrature coupling, T is a temperature of the resonator, $A^i$ is a vibration amplitude of the resonator, and $k_{P_i}$, $k_{Q_i}$, $k_{C_i}$ and $k_{A_i}$ are linear regression fitting coefficients.

11. The gyro measurement while drilling system according to claim 10, wherein the initial alignment algorithm comprises a two-position analytical alignment algorithm.

12. The gyro measurement while drilling system according to claim 11, wherein a well inclination angle calibrated by the two-position analytical alignment algorithm is:

$$\hat{\theta} = a\tan 2(\hat{f}_y^b, \sqrt{(\hat{f}_x^b)^2 + (\hat{f}_z^b)^2});$$

a calibrated tool face angle is:

$$\hat{\gamma} = a\tan 2[-\hat{f}_x^b,(\overline{f}_z^{b2} + \overline{f}_z^{b1})];$$

a calibrated azimuth angle is:

$$\hat{\psi} = a\tan 2(\hat{\omega}_x^b \cos\hat{\gamma} + \hat{\omega}_z^b \sin\hat{\gamma}, \hat{\omega}_x^b \sin\hat{\theta}\sin\hat{\gamma} + \hat{\omega}_y^b \cos\hat{\theta} - \hat{\omega}_z^b \cos\hat{\gamma}\sin\hat{\theta}),$$

wherein positions of the gyroscope before and after the position is changed are $b_1$ and $b_2$, and average values of sampling outputs of corresponding gyroscopes in alignment time are $\overline{\omega}^{b1}$ and $\overline{\omega}^{b2}$, respectively, and average values of sampling outputs of the accelerometer before and after the position is changed are $\overline{f}^{b1}$ and $\overline{f}^{b2}$, respectively; subscripts x, y and z respectively represent components of the sampling output mean values on x, y and z axes respectively;

wherein, an estimated value of the accelerometer after two-position calibration is:

$$\begin{cases} \hat{f}_x^b = \frac{1}{2}(\overline{f}_x^{b2} - \overline{f}_x^{b1}) \\ \hat{f}_y^b = \frac{1}{2}(\overline{f}_y^{b2} - \overline{f}_y^{b1}) \end{cases};$$

an estimated value of the gyroscope after two-position calibration is:

$$\begin{cases} \hat{\omega}_x^b = \frac{1}{2}(\overline{\omega}_x^{b2} - \overline{\omega}_x^{b1}) \\ \hat{\omega}_y^b = \frac{1}{2}(\overline{\omega}_y^{b2} - \overline{\omega}_y^{b1}) \end{cases},$$

and the accelerometer and gyroscope of a Z axis are unobservable, and an average value before and after the positions are changed is directly taken as the estimated value after calibration:

$$\begin{cases} \hat{f}_z^b = \frac{1}{2}(\overline{f}_z^{b2} + \overline{f}_z^{b1}) \\ \hat{\omega}_z^b = \frac{1}{2}(\overline{\omega}_z^{b2} + \overline{\omega}_z^{b1}) \end{cases}.$$

13. The gyro measurement while drilling system according to claim 9, wherein the initial alignment algorithm further comprises a Kalman filtering algorithm to further optimize an estimated azimuth angle, a well inclination angle and a tool face angle of the measuring system.

14. The gyro measurement while drilling system according to claim 9, wherein the continuous measurement while drilling comprises a well trajectory fitting algorithm under measurement while drilling, and for continuous measurement while drilling, the well trajectory is calculated and fitted by way of multi-chip module (MCM).

* * * * *